US011110553B2

(12) United States Patent
McClure

(10) Patent No.: US 11,110,553 B2
(45) Date of Patent: Sep. 7, 2021

(54) ALIGNMENT TOOL FOR POSITIONING AND ALIGNING TUBULAR SECTIONS

(71) Applicant: Walhonde Tools, Inc., South Charleston, WV (US)

(72) Inventor: Matthew McClure, Charleston, WV (US)

(73) Assignee: Walhonde Tools, Inc., South Charleston, WV (US)

( * ) Notice: Subject to any disclaimer, the term of this patent is extended or adjusted under 35 U.S.C. 154(b) by 63 days.

(21) Appl. No.: 16/351,019

(22) Filed: Mar. 12, 2019

(65) Prior Publication Data

US 2019/0210168 A1 Jul. 11, 2019

Related U.S. Application Data

(63) Continuation of application No. 15/634,286, filed on Jun. 27, 2017, now Pat. No. 10,226,843, which is a
(Continued)

(51) Int. Cl.
*G01B 5/25* (2006.01)
*B23K 37/053* (2006.01)
(Continued)

(52) U.S. Cl.
CPC .......... *B23K 37/0533* (2013.01); *F16L 13/02* (2013.01); *F16L 55/07* (2013.01); *G01B 5/25* (2013.01); *F16L 2201/00* (2013.01)

(58) Field of Classification Search
CPC .................................. B25H 7/005; G01B 5/25
(Continued)

(56) References Cited

U.S. PATENT DOCUMENTS 3,400,872 A 9/1968 Rogers
3,952,936 A 4/1976 Dearman
(Continued)

FOREIGN PATENT DOCUMENTS

SU 477807 7/1975

*Primary Examiner* — George B Bennett
(74) *Attorney, Agent, or Firm* — Kelley Drye & Warren LLP

(57) ABSTRACT

An alignment tool for positioning and aligning the adjacent ends of pipes in optimum desired relation for joining the tubular sections by welding. The alignment tool comprises a first and second annularly shaped clamping rings and a plurality of swivel assemblies connecting and circumferentially spaced about the first and second clamping rings, wherein the swivel assemblies adjust the distance between the first and second clamping rings and adjust the first and second clamping rings transversely and axially with respect to each other. Each swivel assembly comprises a first swivel portion connected to the first clamping ring, a second swivel portion connected to the second clamping ring, and a threaded bolt extending through the first swivel portion and the second swivel portion. The first swivel portion comprises an axel alignment swivel including a longitudinal shaft with a first partial spherical portion at its center, wherein the first partial spherical portion is retained within a bore extending through the first clamping ring. The second swivel portion comprises a second partial spherical portion that is retained within a bore extending through the second clamping ring.

20 Claims, 18 Drawing Sheets

Related U.S. Application Data continuation of application No. 14/817,257, filed on Aug. 4, 2015, now Pat. No. 9,687,941.

(51) Int. Cl.
*F16L 55/07* (2006.01)
*F16L 13/02* (2006.01)

(58) Field of Classification Search
USPC .................................. 33/412, 529, 613, 645
See application file for complete search history.

(56) References Cited

U.S. PATENT DOCUMENTS

| | | | |
|---|---|---|---|
| 4,413,415 A | 11/1983 | Stovall | |
| 4,493,139 A | 1/1985 | McClure | |
| 4,579,272 A | 4/1986 | McClure | |
| 4,586,264 A * | 5/1986 | Zatezalo | G01B 5/25 33/412 |
| 4,722,468 A | 2/1988 | McClure | |
| 4,750,662 A | 6/1988 | Kagimoto | |
| 4,769,889 A | 9/1988 | Landman et al. | |
| 4,846,391 A | 7/1989 | McClure | |
| 4,936,500 A | 6/1990 | McClure | |
| 5,052,608 A | 10/1991 | McClure | |
| 5,118,024 A | 6/1992 | McClure | |
| 5,141,276 A | 8/1992 | McClure | |
| 5,165,160 A | 11/1992 | Poncelet | |
| 5,222,306 A | 6/1993 | Neumann | |
| 5,481,793 A | 1/1996 | McClure | |
| 5,865,430 A | 2/1999 | Conover | |
| 5,887,329 A | 3/1999 | Pfeiffer | |
| 6,640,827 B1 | 11/2003 | McClure | |
| 6,775,890 B2 | 8/2004 | Kolarik | |
| 6,840,433 B2 | 1/2005 | Vermaat | |
| 7,089,887 B1 | 8/2006 | McClure | |
| 7,191,686 B1 | 3/2007 | Angelle | |
| 7,240,437 B1 | 7/2007 | Moldovan | |
| 7,540,401 B2 | 6/2009 | Vermaat | |
| 7,657,985 B2 | 2/2010 | McClure | |
| 7,690,128 B1 | 4/2010 | Thompson | |
| 8,348,253 B2 | 1/2013 | McClure | |
| 8,397,975 B1 | 3/2013 | Franco | |
| 9,415,542 B2 | 8/2016 | Montgomery | |
| 9,687,941 B2 | 6/2017 | McClure | |
| 10,226,843 B2 * | 3/2019 | McClure | G01B 5/25 |
| 2002/0101017 A1 | 8/2002 | Kolarik | |
| 2002/0153406 A1 | 10/2002 | Vermaat | |
| 2007/0256288 A1 | 11/2007 | Vermaat | |
| 2008/0052892 A1 | 3/2008 | Dwileski | |
| 2010/0140323 A1 | 6/2010 | McClure | |
| 2011/0030231 A1 * | 2/2011 | Mueller | B43L 13/205 33/529 |
| 2011/0115144 A1 | 5/2011 | Carson | |
| 2012/0174372 A1 | 7/2012 | Dagenais | |
| 2014/0047725 A1 * | 2/2014 | Taylor | B23K 31/027 33/529 |
| 2014/0259597 A1 | 9/2014 | Lavalley | |
| 2015/0165672 A1 | 6/2015 | Montgomery | |

\* cited by examiner

ALIGNMENT TOOL FOR POSITIONING AND ALIGNING TUBULAR SECTIONS

CROSS REFERENCE TO RELATED APPLICATION

This application is a continuation of U.S. patent application Ser. No. 15/634,286, filed Jun. 27, 2017, which is a continuation of U.S. patent application Ser. No. 14/817,257, filed Aug. 4, 2015. The entire contents of these applications are incorporated herein by reference.

FIELD OF THE INVENTION

The present invention generally relates to an alignment tool for positioning and aligning tubular sections, and more specifically to a tool used in positioning and aligning the adjacent ends of tubular sections, such as pipes, tubes, fittings, structural arrangements, and the like, in optimum desired relation for joining the tubular sections by welding.

BACKGROUND OF THE INVENTION

Pipe welding to join pipes and fittings is a technique utilized in many industries ranging from residential to industrial construction projects, including, but not limited to, pipelines for oil, gas, water, etc., as well as power, pulp and paper, petro-chemical, food and drug processing, and ship and submarine building and repair industries. Pipes were used to be joined together via consumable rings or inserts inserted between two pipe ends to hold the two pipes together during welding. However, these consumable rings or inserts have a short life cycle when exposed to atmospheric conditions, thus requiring that prefabricated pipe modules be fitted and joined in a relatively short period of time. Otherwise, the consumable ring must be replaced requiring that the fitting procedure be restarted.

To assist in the welding process, a variety of pipe alignment tools were developed to radially position and align the ends of pipes and pipe fittings together to be joined by welding. The tools longitudinally align two ends of pipe sections in relation to each other. These pipe alignment tools generally include two spaced apart rings, lugs, or chains mounted on pipe ends to be joined. The rings, lugs, or chains are mounted and adjusted using a plurality of screws and bolts. Some drawbacks of these tools are that they are bulky, heavy, and difficult to maneuver. The plurality of screws and bolts require long assembly time.

In addition, most of the currently available tools are used to join two straight pipe sections together. While there are tools available that enable joining a straight pipe to an elbow or ell-fitting, many of these tools fit only one type of pipe or fitting connections. As such, separate tools are required to fit different types of connections—e.g., one tool to fit a straight pipe to pipe connection and another tool to fit pipe to ell-fitting connection. An existing tool that attempts to solve this problem utilizes a pair of closely spaced rings mounted in short proximity to the pipe ends, which are usually coextensive. However, not all pipe ends have enough space to mount such an alignment tool. Also, because of the proximity of the tool rings, this tool hinders the workspace of the welder who needs to get in between the pipe rings to weld the pipes. In addition, many tools are only capable of fitting over a pipe with perfectly rounded cross section, but not, for example, over the ends of tee pipe fitting or cross pipe fittings with imperfect cross sections formed due to the bend of the branch portion of the fitting.

Thus, there is a need for an alignment tool for positioning and aligning tubular sections that is compact, lightweight, greatly speeds up attaching the tool to tubular sections, and which can be used to join various types of pipes and pipe fittings.

SUMMARY OF THE INVENTION

An object of the present invention is to provide an alignment tool for positioning and aligning tubular sections that is compact, lightweight, and which greatly speeds up attaching the tool to tubular sections, such as pipes, tubes, fittings, structural arrangements, and the like.

Another object of the invention is to provide an alignment tool that can be used to join various types of pipes and pipe fittings, such as straight pipes, elbow or ell-fittings, tee pipe fitting, cross or 4-way pipe fitting, or any combinations thereof.

Another object of the invention is to provide an alignment tool that is capable of bringing the ends of the pipes to be joined towards and away from each other, transversely in relation to each other, and in angular relation to each other to accurately, positively, quickly and easily position adjacent ends of the tubular members in optimum desired relation for joining the pipes by welding.

Another object of the invention is to provide an alignment tool that clamps on pipes or pipe fittings by means of an adjustable toggle clamp, which increases the speed the tool is attached to the pipes or pipe fittings.

Another object of the invention is to provide an alignment tool comprising cutouts on its exterior surface that help accessing joints between pipes and pipe fittings, such as elbow fitting, during welding.

Another object of the invention is to provide an alignment tool comprising cutouts on its interior surface that allow the tool to be clamped to transitioning areas of elbow or tee fittings.

Another object of the invention is to provide an alignment tool comprising a pair of clamping rings and various components disposed within the tool such that they are located substantially within the outer circumference of the clamping rings, giving the tool a small profile.

In one embodiment, the alignment tool of the present invention comprises a first and second annularly shaped clamping rings and a plurality of swivel assemblies connecting and circumferentially spaced about the first and second clamping rings, wherein the swivel assemblies adjust the distance between the first and second clamping rings and adjust the first and second clamping rings transversely and axially with respect to each other. Each swivel assembly comprises a first swivel portion connected to the first clamping ring, a second swivel portion connected to the second clamping ring, and a threaded bolt extending through the first swivel portion and the second swivel portion. The first swivel portion comprises an axel alignment swivel including a longitudinal shaft with a first partial spherical portion at its center, wherein the first partial spherical portion is retained within a bore extending through the first clamping ring. The second swivel portion comprises a second partial spherical portion that is retained within a bore extending through the second clamping ring. Each of the first and second clamping rings comprises a first and a second semiannual segments each radially extending from a first end to a second end. The first ends of the first and second semiannular segments are interconnected using double hinge joints and the second ends of first and second semiannular segments are interconnected using toggle clamps.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems, methods, and apparati for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended hereto or as subsequently amended, but merely to clarify and exemplify the invention.

DETAILED DESCRIPTION OF THE INVENTION

The invention may be understood more readily by reference to the following detailed description of a preferred embodiment of the invention. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

The present invention provides a tool used in positioning and aligning adjacent ends of tubular sections, such as pipes, tubes, fittings, structural arrangements, and the like, in optimum desired relation for joining the tubular sections by welding. The tool of the present invention may be used to position and align tubular sections used in many industries, including, but not limited to residential or industrial construction projects, pipelines for oil, gas, water, etc., and power, pulp and paper, petro-chemical, food and drug processing, and piping in ships and submarines, as well as repair industries. The design of the tool of the present invention is compact, lightweight, greatly speeds up attaching the tool to tubular sections, and which can be used to join various types of pipes and pipe fittings, including, but not limited to straight pipes, elbow or ell-fittings, tee pipe fitting, cross or 4-way pipe fitting, or any combinations thereof. The tool of the present invention is capable of bringing the ends of the pipes to be joined towards and away from each other, transversely in relation to each other, and in angular relation to each other to accurately, positively, quickly and easily position adjacent ends of the tubular members in optimum desired relation for joining the pipes by welding.

Figure 1:
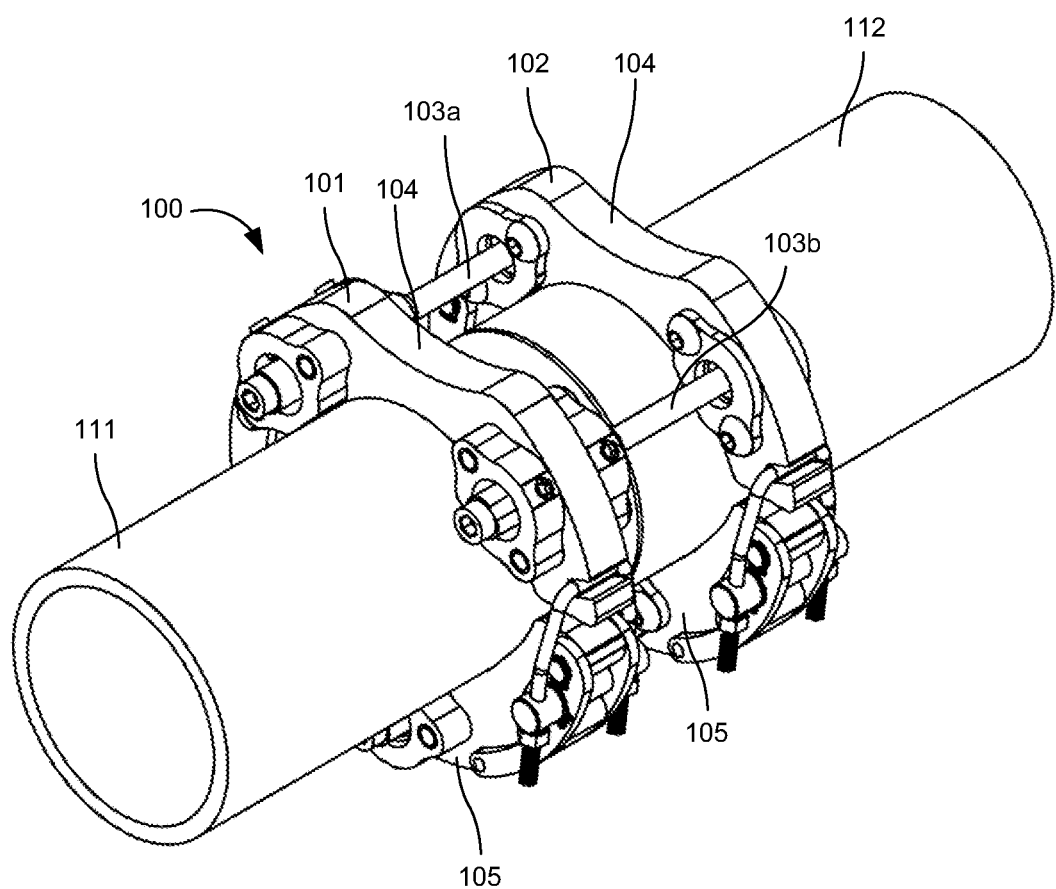
FIG. 1 shows a perspective view of an alignment tool as it is used to join the ends of two pipe sections according to an embodiment of the invention.
Figure 2:
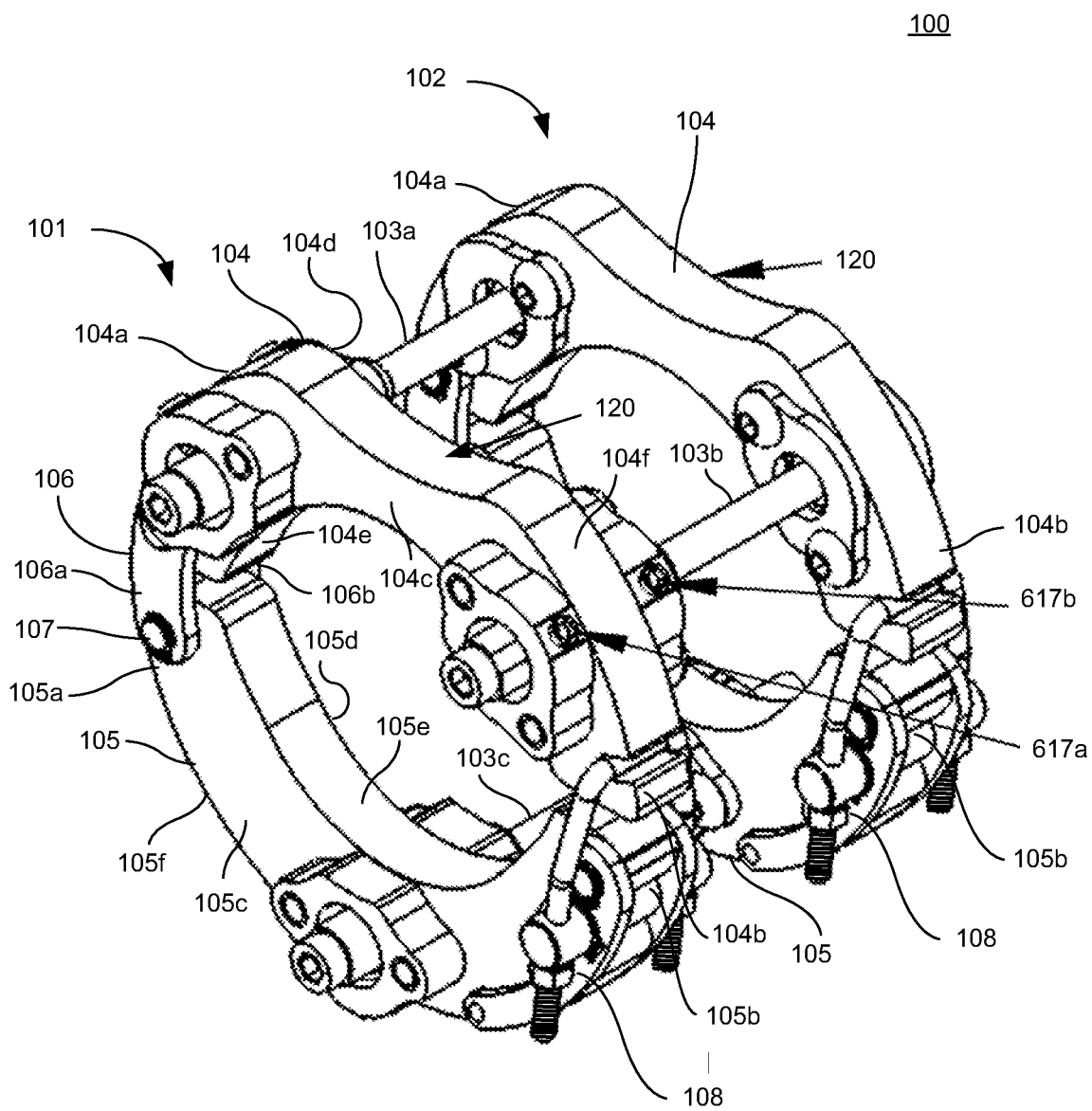
FIG. 2 shows a perspective view of the alignment tool of FIG. 1 in a greater detail.
Figure 3A:
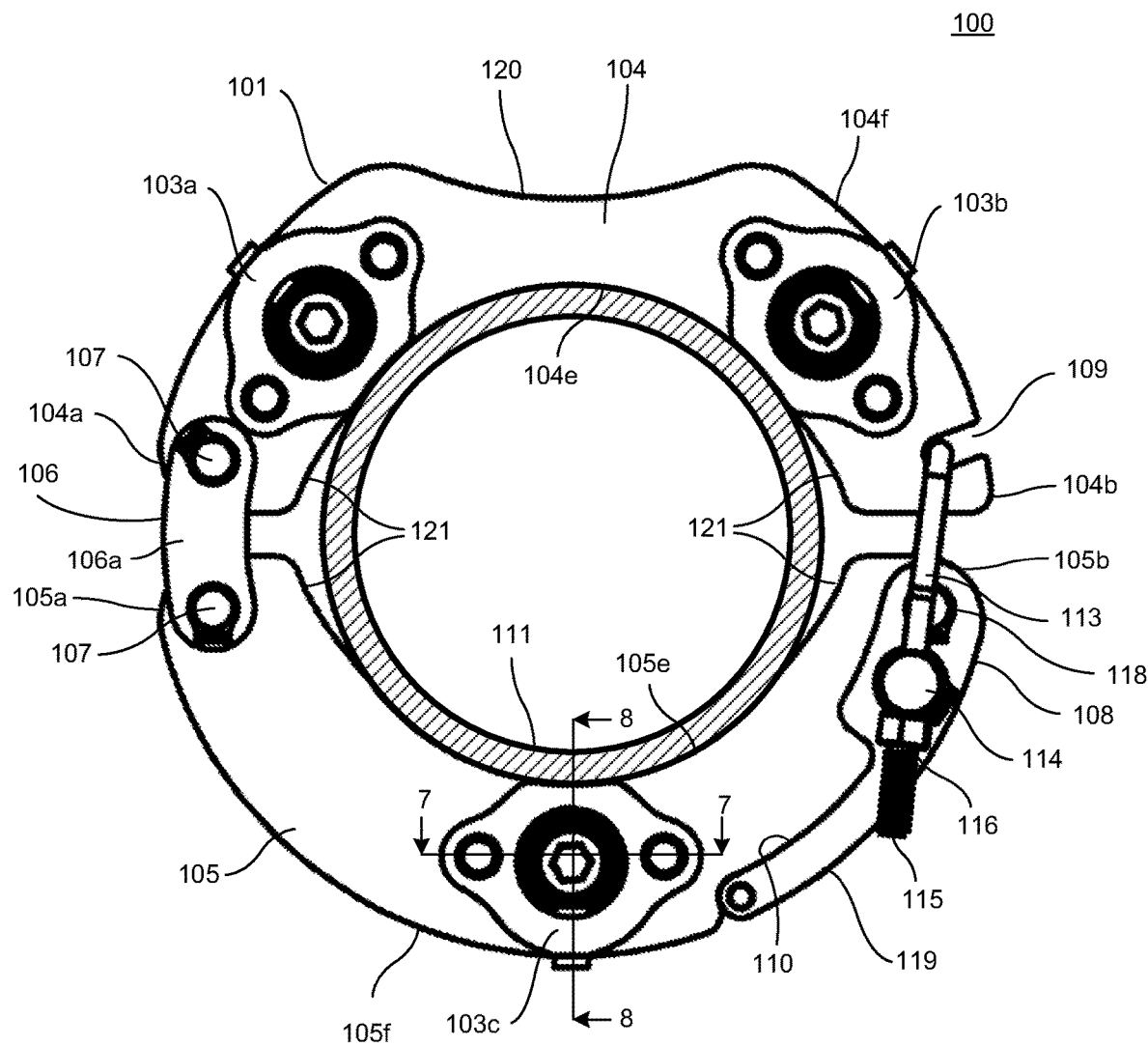
FIG. 3A shows a front view of the alignment tool of FIG. 1 in a closed position.
Figure 3B:
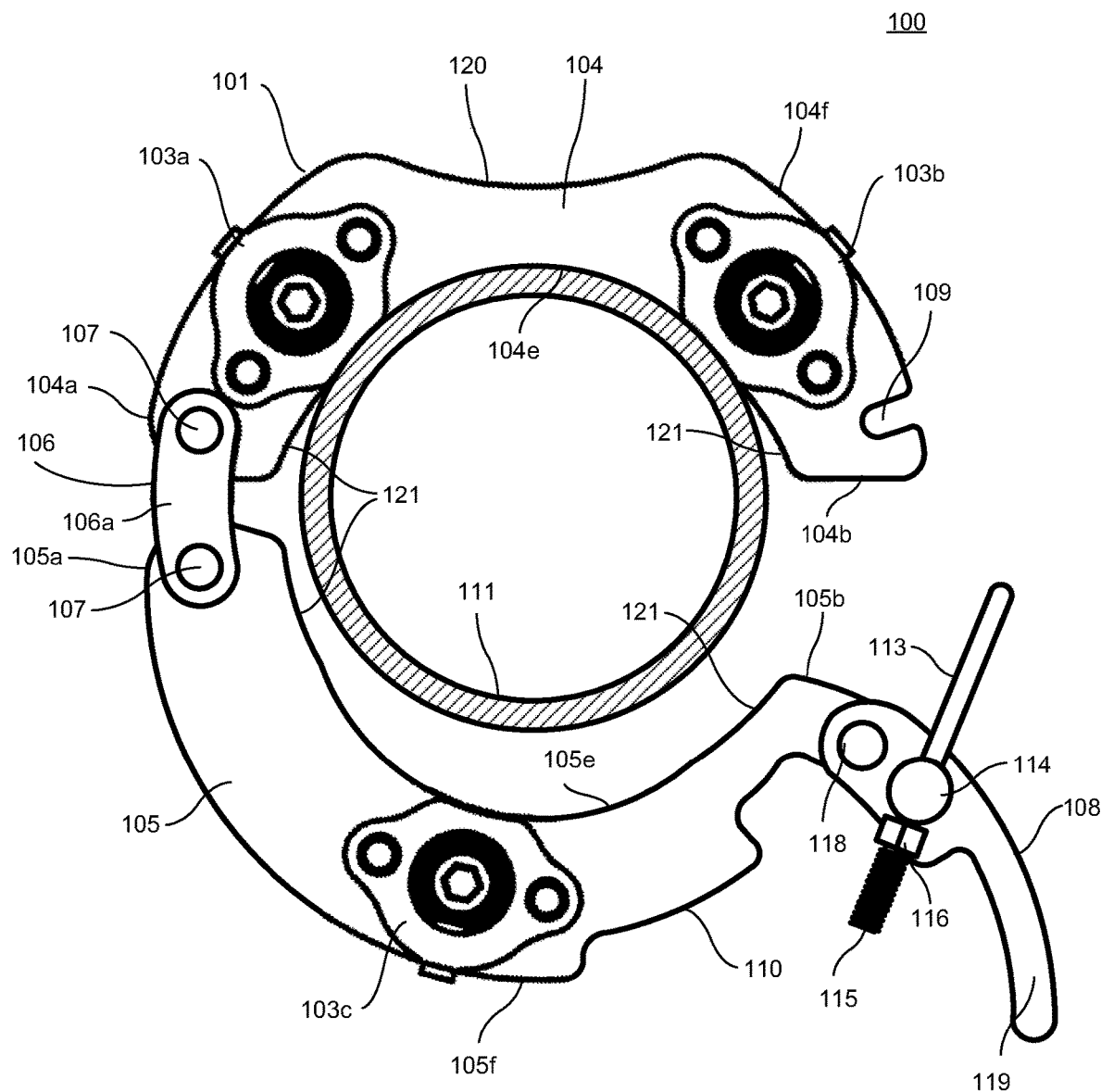
FIG. 3B shows a front view of the alignment tool of FIG. 1 in an opened position.
Figure 4:
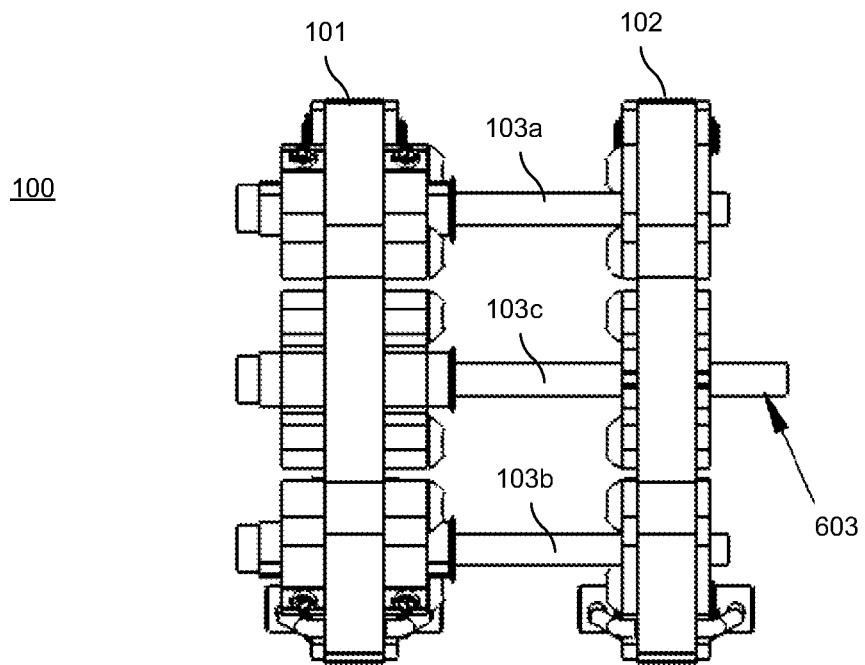
FIG. 4 shows a top view of the alignment tool of FIG. 1.
Figure 5:
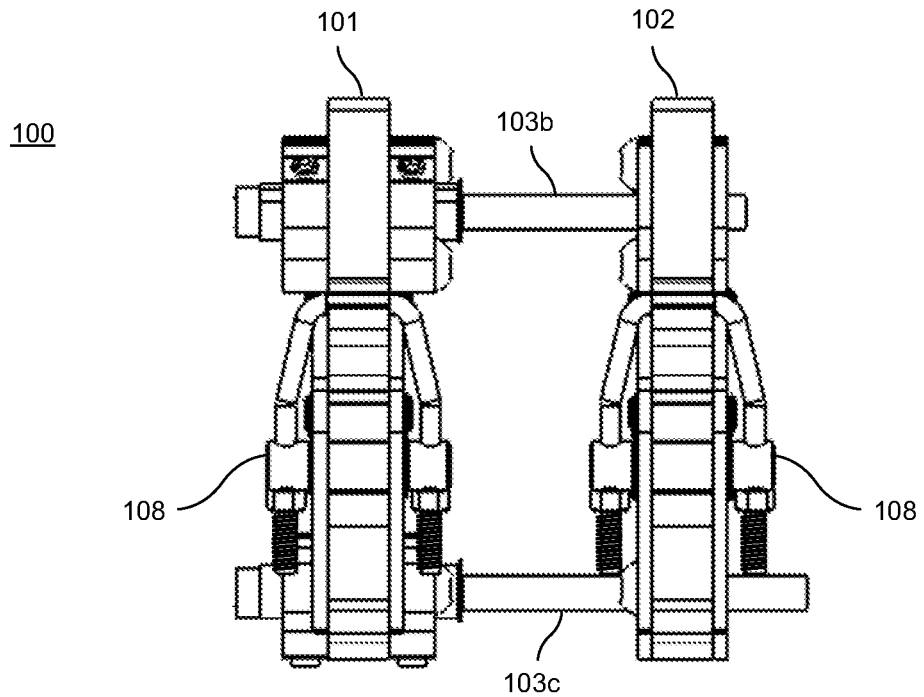
FIG. 5 shows a right side view of the alignment tool of FIG. 1.

Referring now to FIGS. 1-5 of the drawings, there is shown an alignment tool 100 for positioning and aligning the ends of first and second pipe sections 111 and 112. While tool 100 is described herein as aligning pipe section, tool 100 of the present invention may be used to join any types of tubular sections as described above. FIG. 1 shows a perspective view of the alignment tool 100 attached to first and second pipe sections 111 and 112; FIG. 2 shows a perspective view of the alignment tool 100 in a greater detail; FIG. 3A shows a front view of the alignment tool 100 in a closed position; FIG. 3B shows a front view of the alignment tool 100 in an opened position; FIG. 4 shows a top view of the alignment tool 100; and FIG. 5 shows a right side view of the alignment tool 100. As shown in FIG. 2, tool 100 includes a pair of clamping rings 101 and 102, interconnected by a plurality of swivel assemblies 103a, 103b, and 103c. In a preferred embodiment, three swivel assemblies 103a, 103b, and 103c are utilized. However, the tool of the present invention may utilize two swivel assemblies, or more than three swivel assemblies, without departing from the scope of the present invention. For example, in large applications, as many as six swivel assemblies may be utilized for securely holding large pipes together. Swivel assemblies 103a, 103b, and 103c are circumferentially spaced about clamping rings 101 and 102. In a preferred embodiment, the various components of the alignment tool 100, including swivel assemblies 103a, 103b, and 103c, are disposed within the tool such that they are located substantially within the outer circumference of clamping rings 101 and 102, such as shown in FIG. 3A. As a result, the alignment tool 100 is compact and lightweight.

In one embodiment, clamping rings 101 and 102 comprise substantially identical annular shaped bodies each including two semiannular segments 104 and 105. The illustrated clamping rings 101, 102 are shaped and used to join cylindrical shaped pipes. Alternatively, clamping rings 101, 102 may be shaped and used to join other shaped tubing without departing from the scope of the present invention, including, but not limited to oval, square, rectangular, or the like. Referring specifically to FIGS. 2-3A, first and second segments 104 and 105 radially extend from first ends 104a, 105a to second ends 104b, 105b (FIG. 3A) and comprise front surfaces 104c, 105c, rear surfaces 104d, 105d, inner surfaces 104e, 105e, and outer surfaces 104f, 105f, respectively (FIG. 2). First ends 104a and 105a of first and second segments 104 and 105 are preferably spaced apart and interconnected using a double hinge joint 106, which allows the semiannular segments 104 and 105 to be adjusted from a closed position (FIG. 3A) to an opened position (FIG. 3B), and vice versa. Each double hinge joint 106 comprises two oppositely disposed plates or links 106a and 106b—first link 106a being disposed on the front surfaces 104c, 105c of first and second segments 104 and 105, and second link 106b oppositely disposed on the rear surfaces 104d, 105d of first and second segments 104 and 105 (FIG. 2). Links 106a and 106b are interconnected using a pair of hinge pins 107 that traverse the first ends 104a, 105a of first and second segments 104 and 105.

As shown in FIGS. 3A-3B, second ends 104b and 105b of first and second segments 104 and 105 are also preferably spaced apart and interconnected using an adjustable latch toggle clamp 108. Second end 105b of second segment 105 comprises a recess 110 (FIG. 3B) in the outer surface 105f of the second segment 105 sized to accommodate the latch toggle clamp 108 such that in a closed position the latch toggle clamp 108 is substantially coextensive with the circumference or outer surface 105f of the second semiannular segment 105 (FIG. 3A). Toggle clamp 108 comprises a rounded locking lever 119 with outer surface configured to follow the annular shape of the second segment 105. In other words, each latch toggle clamp 108 is designed to fit within the outer circumference of the clamping rings 101, 102. Locking lever 119 is rotationally secured to the second end 105b of semiannular segment 105 via pin 118 that traverses the second end 105b. A U-shaped rod 113 is rotationally secured to the locking lever 119 via pin 114. U-shaped rod 113 preferably comprises threaded ends 115 that extend through bores in the opposing ends of pin 114 such that the rod can be longitudinally adjusted with respect to the locking lever 119 using hexagonal nuts 116 as clearly shown in FIG. 2. Second end 104b of first semiannular segment 104 comprises a groove 109 transversely extending on the outer surface 104f that is used to catch the U-shaped rod 113 therein.

In a preferred embodiment, each clamping ring 101, 102 comprises a scalloped cutout 120 on the outer surface 104f of the first semiannular segment 104. However, other shaped cutouts may be utilized without departing from the scope of the present invention, such as, straight cutouts, semi-rectangular cutouts, semi-trapezoidal cutouts, or the like. When the alignment tool 100 is used to be secured to an ell-fitting, for example, the scalloped cutouts 120 help accessing the joint on the inside radius of the ell-fitting during welding easier, as will be later described. Additional cutouts 121 (FIGS. 3A-3B) are provided on the inner surfaces 104e, 105e, on each of the first ends 104a, 105a and second ends 104b, 105b of first and second segments 104 and 105. Cutouts 121 extend outwardly from the inner circumference of each clamping rings 101, 102 to the terminal ends of the first and second segments 104 and 105. Cutouts 121 allow the clamping rings 101, 102 to clamp on tee fittings, cross fittings, as well as long and short radius ell fittings, as will be later shown and described.

As previously described, the pair of clamping rings 101 and 102 are interconnected by a plurality of swivel assemblies 103a, 103b, and 103c (FIG. 2), which are circumferentially spaced about the clamping rings 101 and 102. Preferably, as shown in FIG. 3A, the first semiannular segment 104 of each clamping ring 101, 102 is connected to two swivel assemblies 103a and 103b, each arranged at each end 104a, 104b of the first semiannular segment 104. The second semiannular segment 105 is connected to a single swivel assembly 103c disposed at its center.

Figure 6:
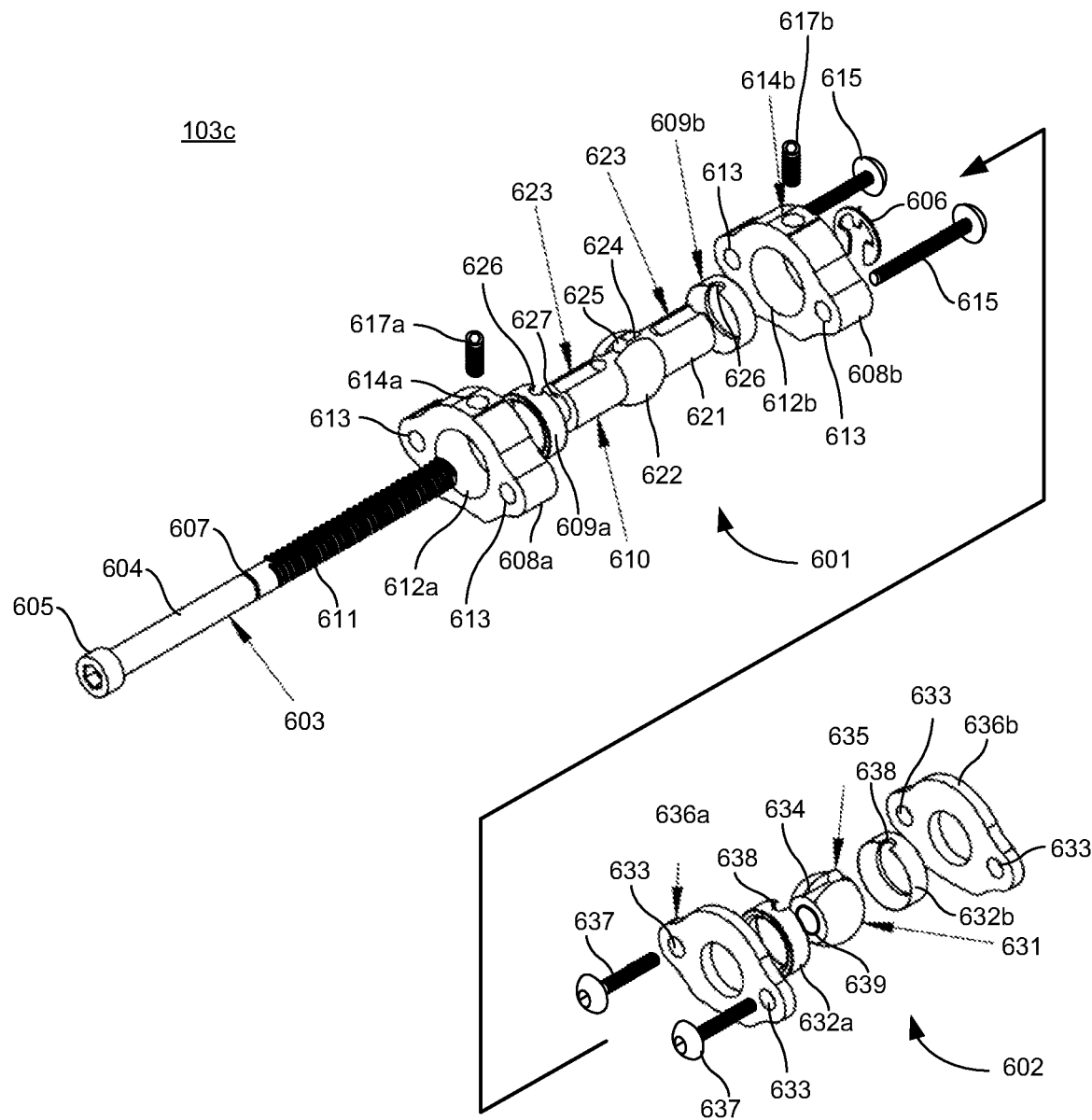
FIG. 6 shows an exploded view of a swivel assembly of the alignment tool according to an embodiment of the invention.
Figure 7:
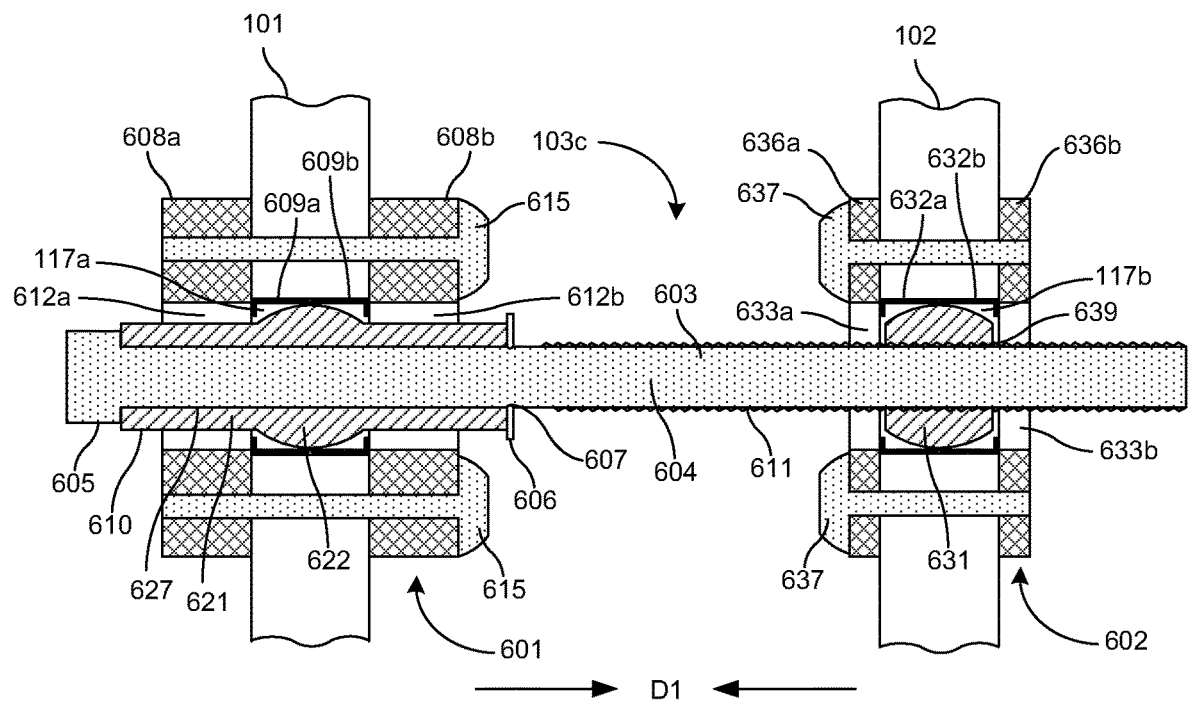
FIG. 7 shows a cross sectional view of the swivel assembly of FIG. 6 taken along line 7-7 in FIG. 3A.
Figure 8A:
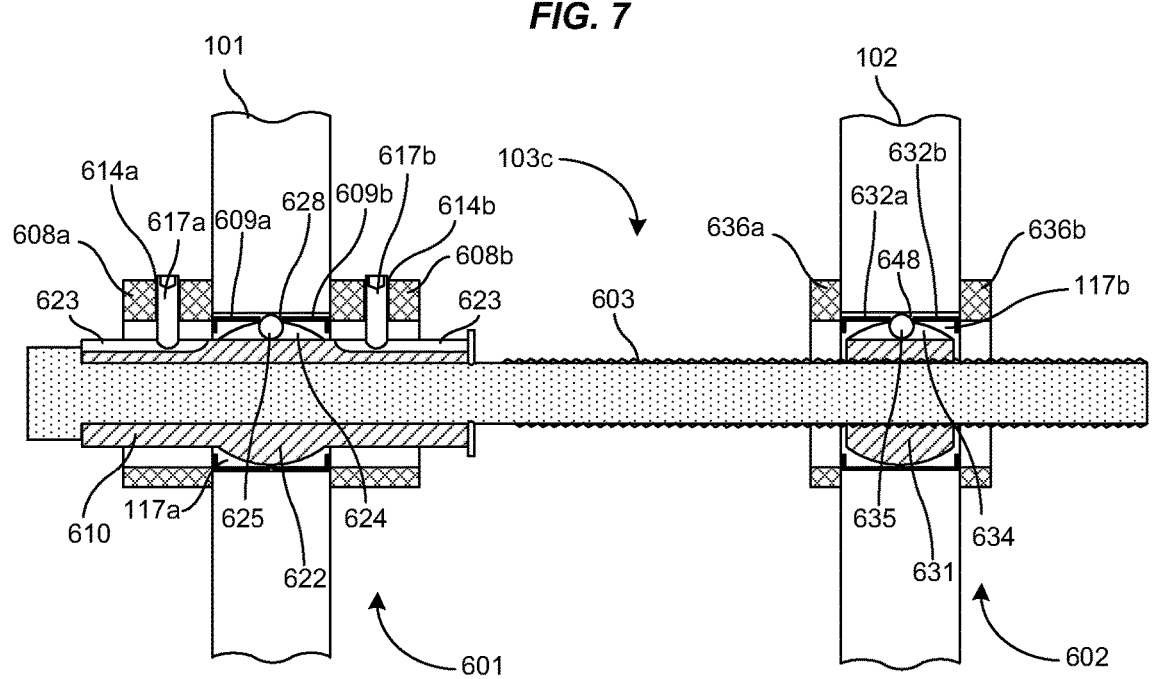
FIG. 8A shows a cross sectional view of the swivel assembly of FIG. 6 taken along line 8-8 in FIG. 3A.

Referring now to FIGS. 6-8A, FIG. 6 illustrates an exploded view of the swivel assembly 103c; FIG. 7 illustrates a cross sectional view of the swivel assembly 103c taken along line 7-7 in FIG. 3A; and FIG. 8A illustrates a cross sectional view of the swivel assembly 103c taken along line 8-8 in FIG. 3A. While only swivel assembly 103c is being shown and described in a greater detail, swivel assembly 103c is substantially identical to swivel assemblies 103a and 103b. As shown in FIG. 7, swivel assembly 103c comprises a first swivel portion 601 connected to the first clamping ring 101 and a second swivel portion 602 connected to the second clamping ring 102. First and second clamping rings 101, 102 comprise bores 117a, 117b traversely extending therethrough for receiving the swivel assembly 103c. The first and second swivel portions 601 and 602 are interconnected via bolt 603. In a preferred embodiment, as shown in FIGS. 4-5, at least one swivel assembly, in this case swivel assembly 103c, comprises a longer bolt 603 such that the alignment tool 100 can be adjusted to fit elbow or ell-fittings, as will be later described.

As shown in greater detail in FIG. 6, bolt 603 comprises a shaft 604 connected to a head 605. The head 605 may comprise a grade eight socket to enable rotation of the bolt 603 using a complementary tool. Of course, the head 605 may comprise other types of shaped head or shaped recess for receiving a complementary tool, such as a slot, Phillips, or Robertson recesses, or square or hex shaped heads. Shaft 604 preferably comprises a groove 607 extending circumferentially thereon. Groove 607 is sized to receive a retaining ring or E-clip 606. Shaft 604 further comprises threads 611 extending circumferentially about the shaft 604 below groove 607.

The first swivel portion 601 comprises a pair of substantially similar retaining plates or saddle shaped portions 608a and 608b, a pair of swivel races 609a and 609b, and an axel alignment swivel 610. The axel alignment swivel 610 comprises a longitudinal shaft 621 with a partial spherical portion 622 at its center. The shaft 621 is longitudinally cannulated comprising longitudinal bore 627 for receiving the bolt 603 therethrough. The partial spherical portion 622 comprises a longitudinal groove 624 for retaining a ball 625, which travels along the length of groove 624. The shaft 621 comprises longitudinal grooves 623 extending on each side of the partial spherical portion 622. Each of the pair of swivel races 609a and 609b comprise semicircular grooves 626 for retaining the ball 625 therebetween.

As shown in FIG. 7, the axel alignment swivel 610 extends through the bore 117a of first clamping ring 101 such that the partial spherical portion 622 is located within the bore 117a. The pair of swivel races 609a and 609b are located on either side of the partial spherical portion 622 to retain it within the bore 117a of first clamping ring 101. In an alternative embodiment, 0-rings may be used to retain the partial spherical portion 622 within the bore 117a. Ball 625 is held within semicircular grooves 626 of swivel races 609a and 609b (FIGS. 6 and 8A). In addition, bore 117a has a longitudinal groove 628 corresponding, aligned, and substantially parallel to longitudinal groove 624, such that the ball 625 is retained and travels between grooves 628 and 624 within the bore 117a (FIGS. 6 and 8A). Ball 625 is used to hold the axel alignment swivel 610 in place so that it does not turn axially with respect to the first clamping ring 101 when the bolt 603 is turned to adjust the gap between the first and second clamping rings 101 and 102. In addition, ball 625 ensures that the transverse screws 617a, 617b are maintained centered in relation to the longitudinal grooves 623 of the axel alignment swivel 610. As shown in FIG. 7, saddle shaped portions 608a and 608b are secured to the opposing surfaces of the first clamping ring 101 using rivets 615. Each saddle shaped portion 608a, 608b comprises a bore 612a, 612b extending therethrough for receiving the axel alignment swivel 610. In a preferred embodiment, bores 612a, 612b of saddle shaped portions 608a, 608b comprise smaller diameter than bore 117a of clamping ring 101 such that saddle shaped portions 608a and 608b secure swivel races 609a and 609b therebetween within the bore 117a. As shown in FIGS. 6 and 8A, each saddle shaped portion 608a, 608b further comprises a transverse threaded bore 614a, 614b for threadably receiving threaded transverse screws 617a, 617b. Threaded screws 617a, 617b engage the longitudinal grooves 623 of the axel alignment swivel 610 to radially adjust the axel alignment swivel 610 with respect to the first clamping ring 101. Bolt 603 extends longitudinally through bore 627 of axel alignment swivel 610. The first swivel portion 601 is retained between the bolt head 605 and the retaining ring or E-clip 606 secured to groove 607 of bolt 603.

Referring back to FIG. 6, the second swivel portion 602 comprises a second partial spherical portion 631, a pair of swivel races 632a and 632b, and a pair of retaining plates or saddle shaped portions 636a and 636b. The second partial spherical portion 631 also comprises a longitudinal groove 634 for retaining a ball 635, which travels along the length of groove 634. In addition, the second partial spherical portion 631 comprises an inner threaded bore 639 for retaining the threads 611 of bolt 603. Each of the pair of swivel races 632a and 632b comprise semicircular grooves 638 for retaining the ball 635 therebetween.

Referring to FIG. 7, the second partial spherical portion 631 is located within bore 117b of the second clamping ring 102. The pair of swivel races 632a and 632b are located on either side of the second partial spherical portion 631 to retain it within the bore 117b of second clamping ring 102. Ball 635 is held within semicircular grooves 638 of swivel races 632a and 632b (FIGS. 6 and 8A). In addition, bore 117b has a longitudinal groove 648 corresponding, aligned, and substantially parallel to longitudinal groove 634 such that the ball 635 is retained and travels between grooves 648 and 634 within the bore 117b (FIGS. 6 and 8A). As such, ball 635 holds the second partial spherical portion 631 in place so that it does not turn axially with respect to the second clamping ring 102 when the bolt 603 is turned to adjust the gap between the first and second clamping rings 101 and 102. Saddle shaped portions 636a and 636b are secured to the opposing surfaces of the second clamping ring 102 using rivets 637. Each saddle shaped portion 636a, 636b comprises a bore 633a, 633b extending therethrough for receiving the shaft 604 of bolt 603. In a preferred embodiment, bores 633a, 633b of saddle shaped portions 636a, 636b comprise smaller diameter than bore 117b of second clamping ring 102 such that saddle shaped portions 636a and 636b secure swivel races 632a and 632b therebetween within the bore 117b. Bolt 603 extends longitudinally through bore 639 of second partial spherical portion 631, such that threads 611 of bolt 603 engage the inner threads of bore 639 of second partial spherical portion 631.

In an alternative embodiment, the first swivel portion 601 and the second swivel portion 602 are substantially identical, both comprising either the adjustable axel alignment swivel 610 or the second partial spherical portion 631 as described above.

The following section describes how the alignment tool 100 is attached to the first and second straight pipe sections 111 and 112 to align these sections as shown in FIG. 1. Referring to FIG. 3B, as the alignment tool 100 is in an unclamped position, clamping ring 101 fits over pipe section 111 by positioning the two semiannular segments 104 and 105 around the pipe section 111. The two semiannular segments 104 and 105 are brought together around the pipe section 111 such that the inner surfaces 104e, 105e of the two semiannular segments 104 and 105 contact the outer surface of pipe section 111 (FIG. 3A). Next, the latch toggle clamp 108 is used to tightly secure the clamping ring 101 around pipe section 111. Specifically, the U-shaped rod 113 of latch toggle clamp 108 is placed within groove 109 at the second end 104b of the first semiannular segment 104. If necessary, hexagonal nuts 116 are loosened to longitudinally extend the U-shaped rod 113 such that it can engage groove 109. Once the U-shaped rod 113 is within groove 109, nut 116 may be tightened. Then, the locking lever 119 is pulled towards the second semiannular segment 105 and clamped in position within recess 110 in the outer surface 105f of the second segment 105. Hexagonal nuts 116 may be tightened on threaded ends 115 of the U-shaped rod 113 to bring second ends 104b, 105b of first and second segments 104 and 105 closer together, thereby tightening the clamping ring 101 around pipe section 111. Clamping ring 102 fits over pipe section 112 in substantially the same manner as described above with reference to clamping ring 101.

After clamping rings 101 and 102 are connected to pipe section 111 and 112, the clamping rings 101 and 102 are adjusted to bring the ends of pipe section 111 and 112 in contact and in perfect alignment. As shown in FIG. 7, to bring the ends of the pipes 111 and 112 to be joined towards each other, head 605 of bolt 603 of each swivel assembly 103a, 103b, 103c is tightened forcing threads 611 to further engage the inner threads of the spherical portion 631. As a result, clamping rings 101 and 102 are pulled in direction D1 towards each other. Similarly, to bring the ends of the pipes 111 and 112 away from each other, head 605 of bolt 603 of each swivel assembly 103a, 103b, and 103c is loosened forcing threads 611 to unthread from the inner threads of the spherical portion 631.

Figure 8B:
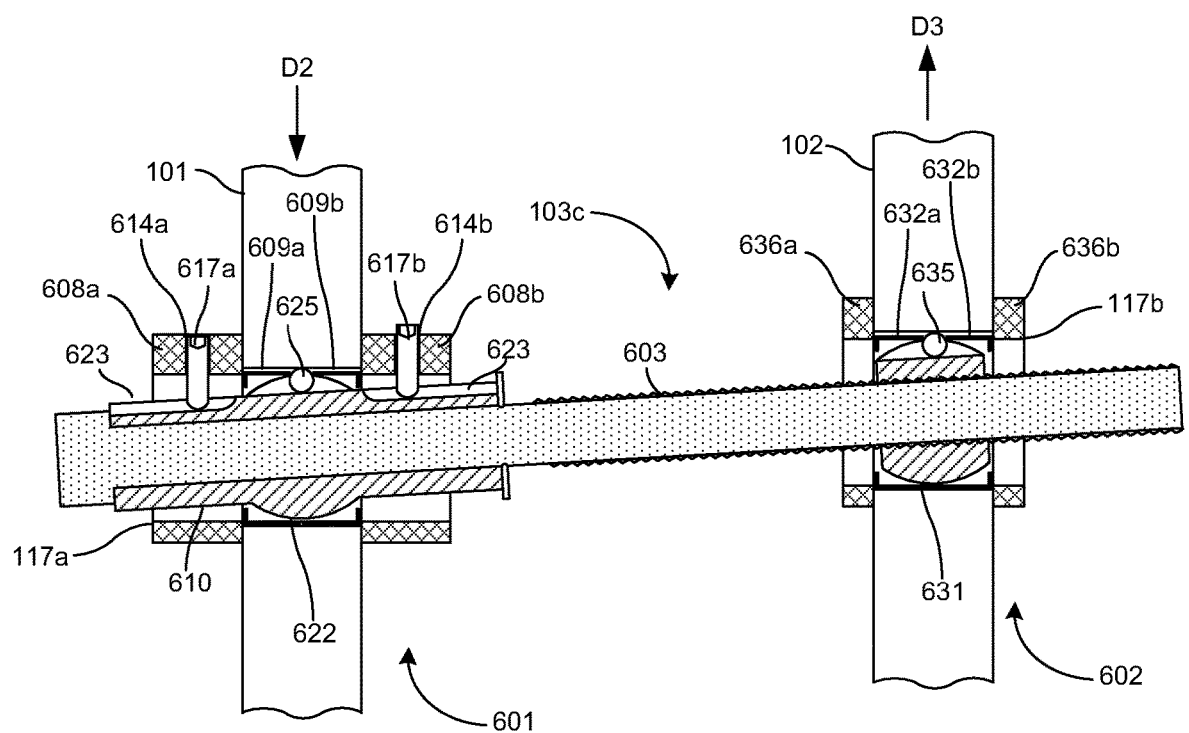
FIG. 8B shows a cross sectional view of the swivel assembly of FIG. 6 taken along line 8-8 in FIG. 3A illustrating how the alignment tool is transversely adjusted in one direction.
Figure 8C:
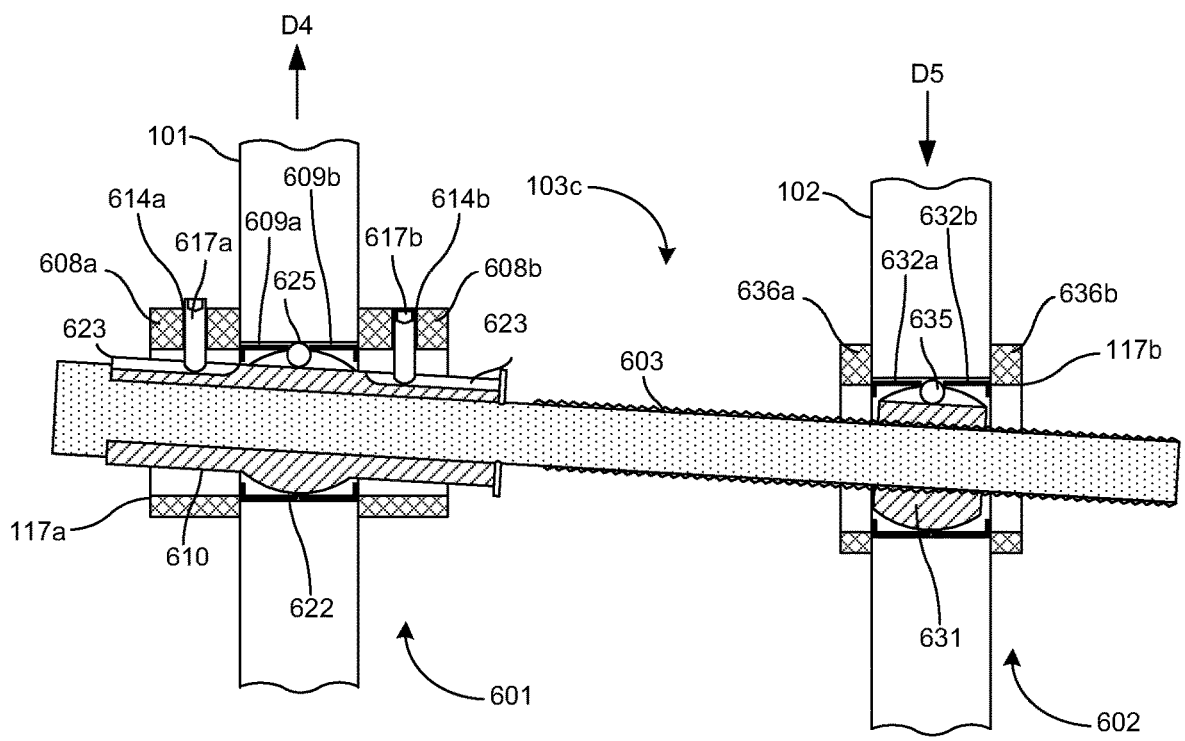
FIG. 8C shows a cross sectional view of the swivel assembly of FIG. 6 taken along line 8-8 in FIG. 3A illustrating how the alignment tool is transversely adjusted in an opposite direction.

Referring to FIGS. 8B-8C, to adjust the clamping rings 101 and 102 transversely in relation to each other, the transverse screws 617a, 617b of each swivel assembly 103a, 103b, and 103c, are either tightened or loosened as required. Specifically referring to FIG. 8B, tightening transverse screw 617a and loosening transverse screw 617b will force the axel alignment swivel 610 to swivel in counterclockwise direction as transverse screws 617a, 617b engage the longitudinal grooves 623 of the axel alignment swivel 610. This causes the second partial spherical portion 631 to also swivel in a counterclockwise direction. Accordingly, first clamping ring 101 will be forced downward in direction D2 and second clamping ring 102 will be forced upward in direction D3. FIG. 8C illustrates how the clamping rings 101 and 102 are adjusted transversely in a reverse direction. Loosening transverse screw 617a and tightening transverse screw 617b will force the axel alignment swivel 610 to swivel in clockwise direction as transverse screws 617a, 617b engage the longitudinal grooves 623 of the axel alignment swivel 610. This causes the second partial spherical portion 631 to also swivel in a clockwise direction. As a result, first clamping ring 101 will be forced upward in direction D4 and second clamping ring 102 will be forced downward in direction D5. This allows the alignment tool 100 to transversely adjust the ends of pipe sections 111 and 112 so that they are perfectly longitudinally aligned and coextensive.

Figure 9A:
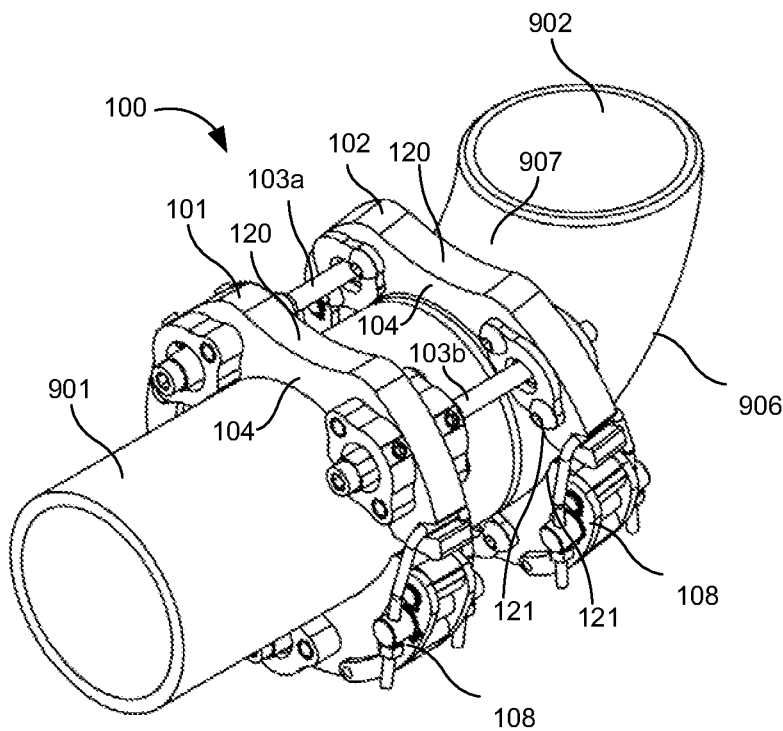
FIG. 9A shows a perspective view of the alignment tool of FIG. 1 as it is used to join the ends of a straight pipe segment to an elbow or ell-fitting.
Figure 9B:
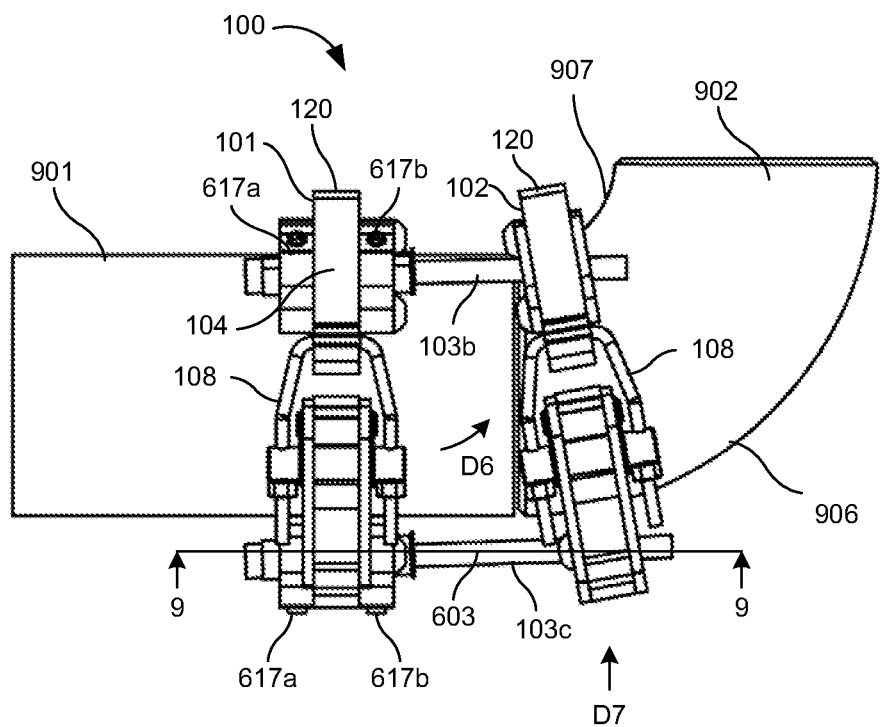
FIG. 9B shows a side view of FIG. 9A.
Figure 9C:
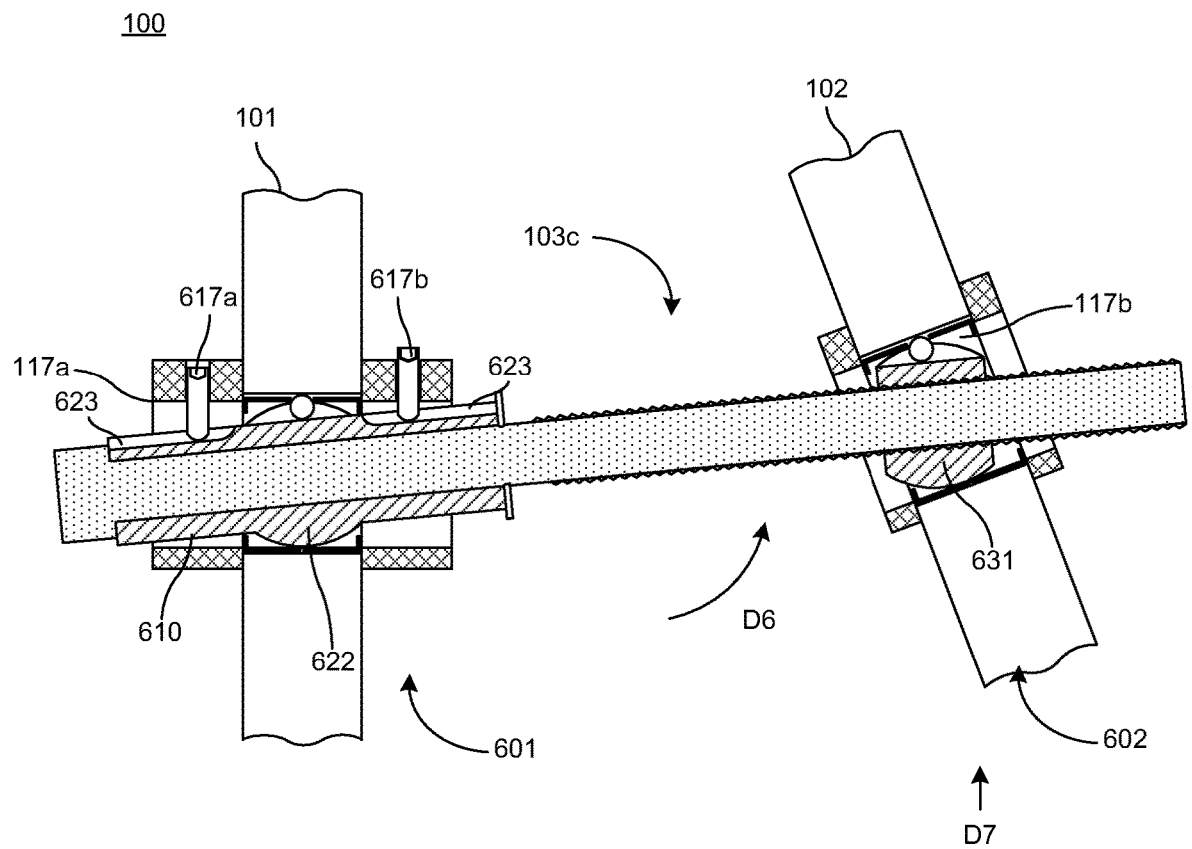
FIG. 9C shows a cross sectional view of the swivel assembly taken along line 9-9 in FIG. 9B.

FIGS. 9A-9C illustrate the alignment tool 100 as it is used to connect and align a straight pipe segment 901 to an elbow or ell-fitting 902. Alignment tool 100 may be used to connect and align similar pipe sections in angular relation to each other in the substantially the same manner. As shown, the clamping rings 101, 102 of alignment tool 100 are adjusted axially in angular relation to each other to bring together and align the ends of the pipe section 901 and the elbow or ell-fitting 902. As described above and as shown in FIGS. 4-5, to accommodate such angular connection, at least one swivel assembly of the alignment tool 100, in this case swivel assembly 103c, comprises a longer bolt 603. Referring back to FIGS. 9A-9B, the first clamping ring 101 attaches around straight pipe section 901 in proximity to its end by securing the latch toggle clamp 108 as previously described. Preferably, the first clamping ring 101 is positioned with respect to the straight pipe section 901 such that swivel assembly 103c is located in proximity of the outer bend radius 906 of the ell-fitting 902, and swivel assemblies 103a, 103b are located in proximity of the inner bend radius 907 of the ell-fitting 902.

As shown in FIG. 9B, because of the curved shape of the ell-fitting 902, to attach the second clamping ring 102 to the ell-fitting 902, the second clamping ring 102 needs to be pivoted in direction D6 and transversely displaced in direction D7 with respect to the first clamping ring 101 until the inner surface of the second clamping ring 102 is aligned with the outer surface of the ell-fitting 902 at a desired position. At that position, however, the ell-fitting 902 may have a different sloped circumference than pipe segment 901 and the inner diameter of the second clamping ring 102. As described above, the alignment tool 100 of the present invention comprises cut outs 121 on the inner surfaces 104e, 105e, on each of the first ends 104a, 105a and second ends 104b, 105b of first and second segments 104 and 105 (FIG. 3A). As shown in FIG. 9A, as the second clamping ring 102 is clamped around the end of the ell-fitting 902, cutouts 121 of the second clamping ring 102 provide spaces for any variations in the sloped circumference of the ell-fitting 902.

To pivot the second clamping ring 102 in direction D6 with respect to the first clamping ring 101, the longer bolt 603 of swivel assembly 103c is loosened, while bolts 603 of swivel assemblies 103a and 103b remain in place or are tightened forcing the second clamping ring 102 to pivot in direction D6 way from first clamping ring 101. To transversely displace second clamping ring 102 in direction D7 with respect to the first clamping ring 101, the transverse screws 617a, 617b of each swivel assembly 103a, 103b, and 103c, are either tightened or loosened as described above. As shown in greater detail in FIG. 9C, second clamping ring 102 pivots with respect to the first clamping ring 101 in direction D6 by means of the rotation of the partial second spherical portion 631 of each swivel assembly 103a, 103b, 103c within bore 117b in the second clamping ring 102. Second clamping ring 102 is transversely displaced with respect to the first clamping ring 101 in direction D7 by means of the rotation of the first partial spherical portion 622 of the axel alignment swivel 610 as transverse screws 617a, 617b engage the longitudinal grooves 623 of the axel alignment swivel 610.

When the second clamping ring 102 is at the desired position with respect to the ell-fitting 902, it is latched on the ell-fitting 902 using the latch toggle clamp 108. Then the alignment tool 100 can be further adjusted as described above to bring the ends of pipe section 901 and ell-fitting 902 in contact and in perfect alignment via further tightening or loosening bolts 603, and transverse screws 617a, 617b of each swivel assembly 103a, 103b, and 103c as required.

Figure 10A:
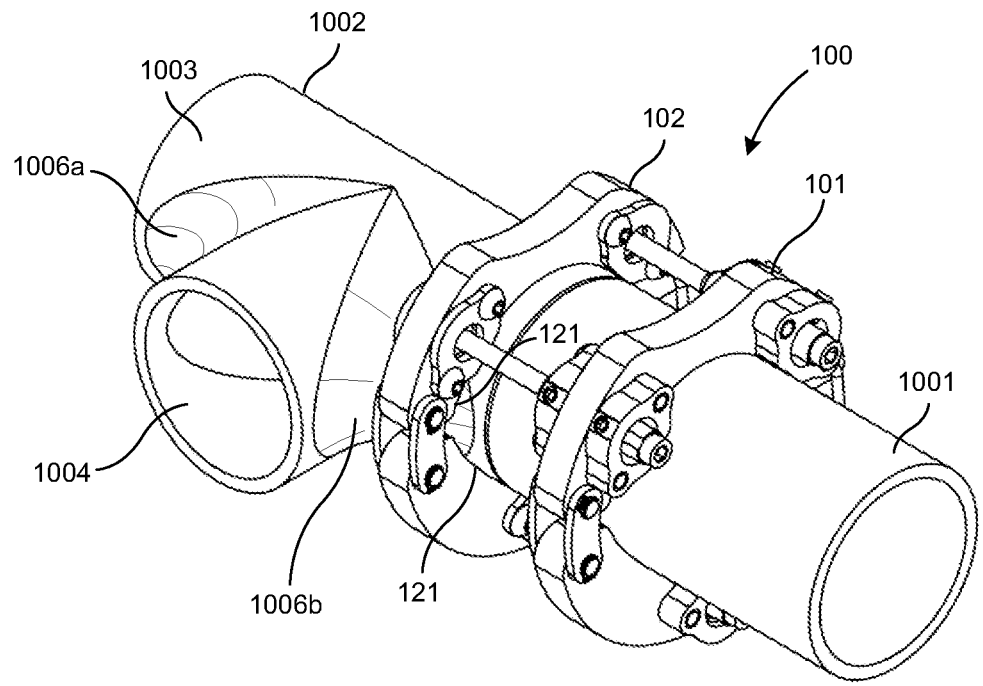
FIG. 10A shows a perspective view of the alignment tool of FIG. 1 as it is used to join the ends of a straight pipe segment to one end of a longitudinally cylindrical body of a tee pipe fitting.
Figure 10B:
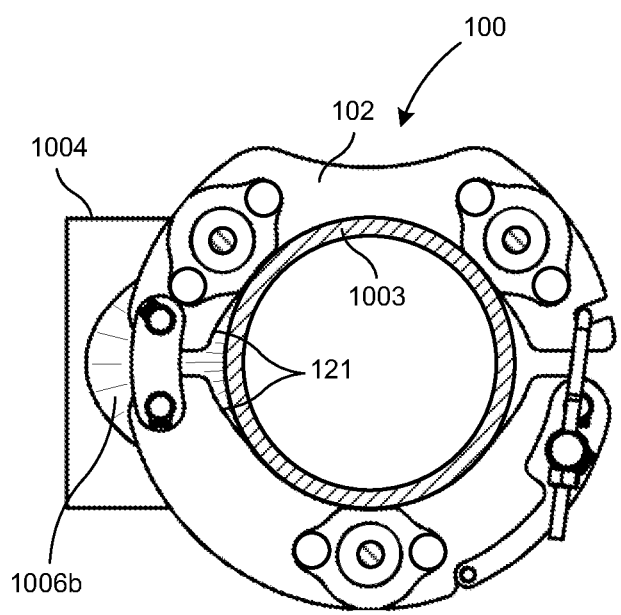
FIG. 10B shows a front view of a clamping ring attached to the tee pipe fitting of FIG. 10A.

As shown in FIGS. 9A-9B, when the first and second clamping rings 101 and 102 of the alignment tool 100 are adjusted angularly with respect to each other, their upper ends proximate to the inner bend radius 907 of the ell-fitting 902 are brought closer together, while their lower ends proximate to the outer bend radius 906 of the ell-fitting 902 are brought further apart. This expands the welding area at the outer bend radius 906 and limits the welding area at the inner bend radius 907 of the ell-fitting 902. To expand the welding area at the inner bend radius 907 of the ell-fitting 902, the first semiannular segments 104 of each clamping ring 101, 102 is provided with a scalloped cutout 120. This makes the join on the inner bend radius 907 more easily accessible for welding. FIGS. 10A-10B illustrate the alignment tool 100 as it is used to connect and align a straight pipe segment 1001 to a tee pipe fitting 1002. A typical tee pipe fitting 1002 comprises a longitudinally cylindrical body 1003 connected to a branch portion 1004 resulting in three ends. In this illustration, the straight pipe segment 1001 is being connected to one end of the longitudinally cylindrical body 1003. The longitudinally cylindrical body 1003 transitions to the branch portion 1004 via curved transitional sections 1006a and 1006b. These curved transitional sections 1006a and 1006b typically hinder the attachment of a perfectly cylindrical alignment tools to either end of the tee pipe fitting 1002. Accordingly, the alignment tool 100 of the present invention comprises cut outs 121 on the inner surfaces 104e, 105e, on each of the first ends 104a, 105a and second ends 104b, 105b of first and second segments 104 and 105 (FIG. 3A). Specifically, cutouts 121 extend outwardly from the inner circumference of each clamping rings 101, 102 to the terminal ends of the first and second segments 104 and 105 (FIG. 3A). As shown in FIG. 10B, as the second clamping ring 102 is clamped around one of the ends of the longitudinally cylindrical body 1003 of the tee pipe fitting 1002, cutouts 121 of the second clamping ring 102 provide space for the curved transitional section 1006b.

Figure 11A:
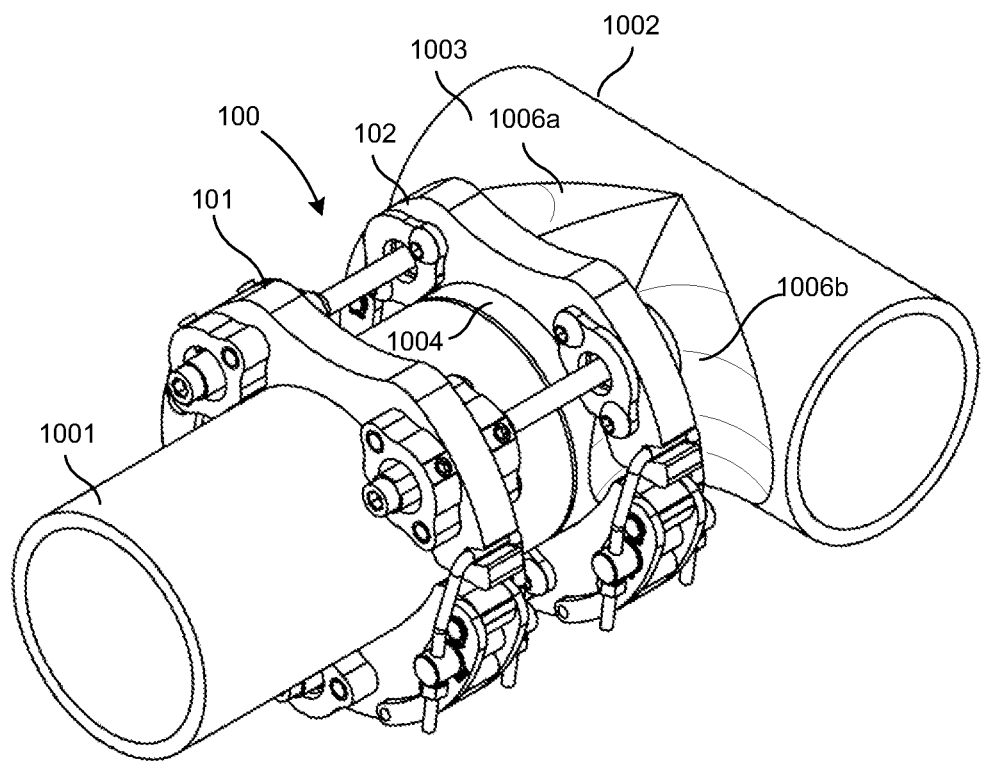
FIG. 11A shows a perspective view of the alignment tool of FIG. 1 as it is used to join the ends of a straight pipe segment to a branch portion of the tee pipe fitting.
Figure 11B:
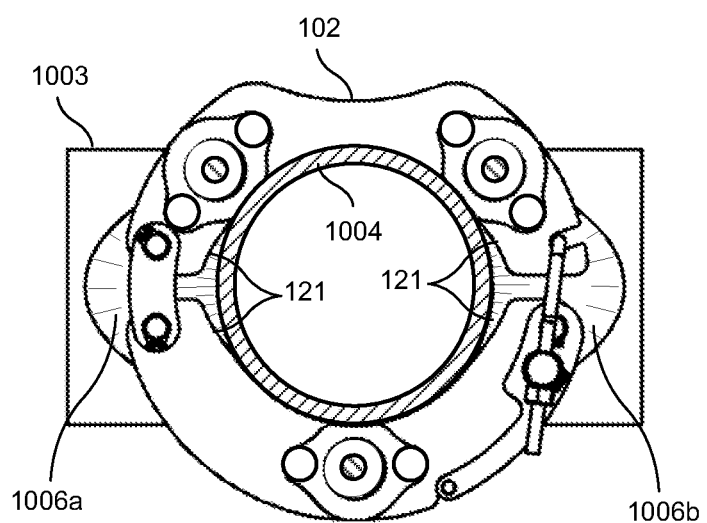
FIG. 11B shows a front view of a clamping ring attached to the tee pipe fitting of FIG. 11A.

Similarly, as shown in FIGS. 11A-11B, the alignment tool 100 of the present invention may be used to connect the straight pipe segment 1001 to the branch portion 1004 of the tee pipe fitting 1002. In a typical configuration, the curved transitional sections 1006a and 1006b would hinder the attachment of a perfectly cylindrical alignment tools to the branch portion 1004. However, as the second clamping ring 102 is clamped around the branch portion 1004 of the tee pipe fitting 1002, cut outs 121 in the second clamping ring 102 provide spaces on each side of the alignment tool 100 for the curved transitional sections 1006a and 1006b.

Figure 12:
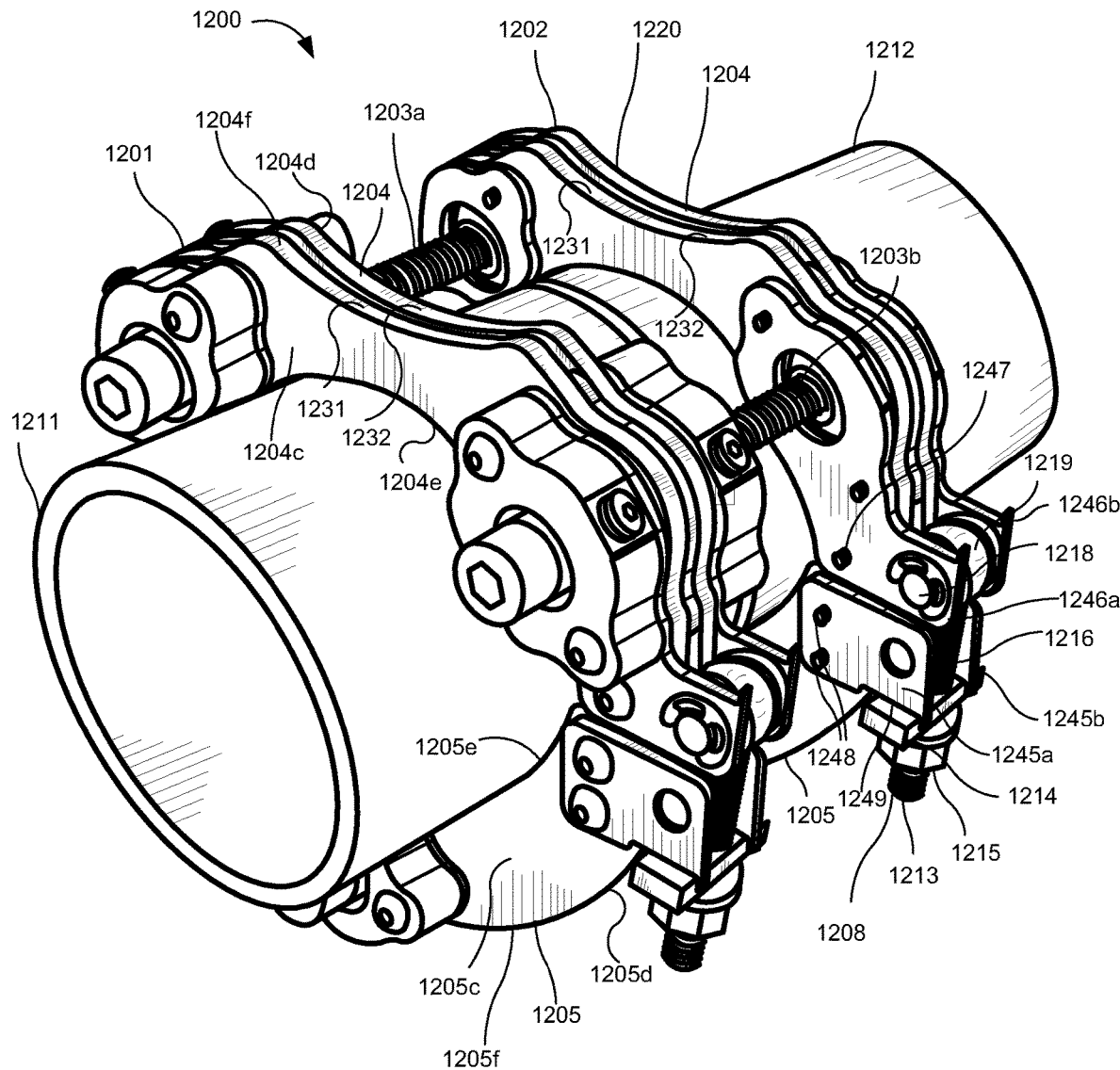
FIG. 12 shows a perspective view of an alignment tool according to another embodiment of the invention.
Figure 13:
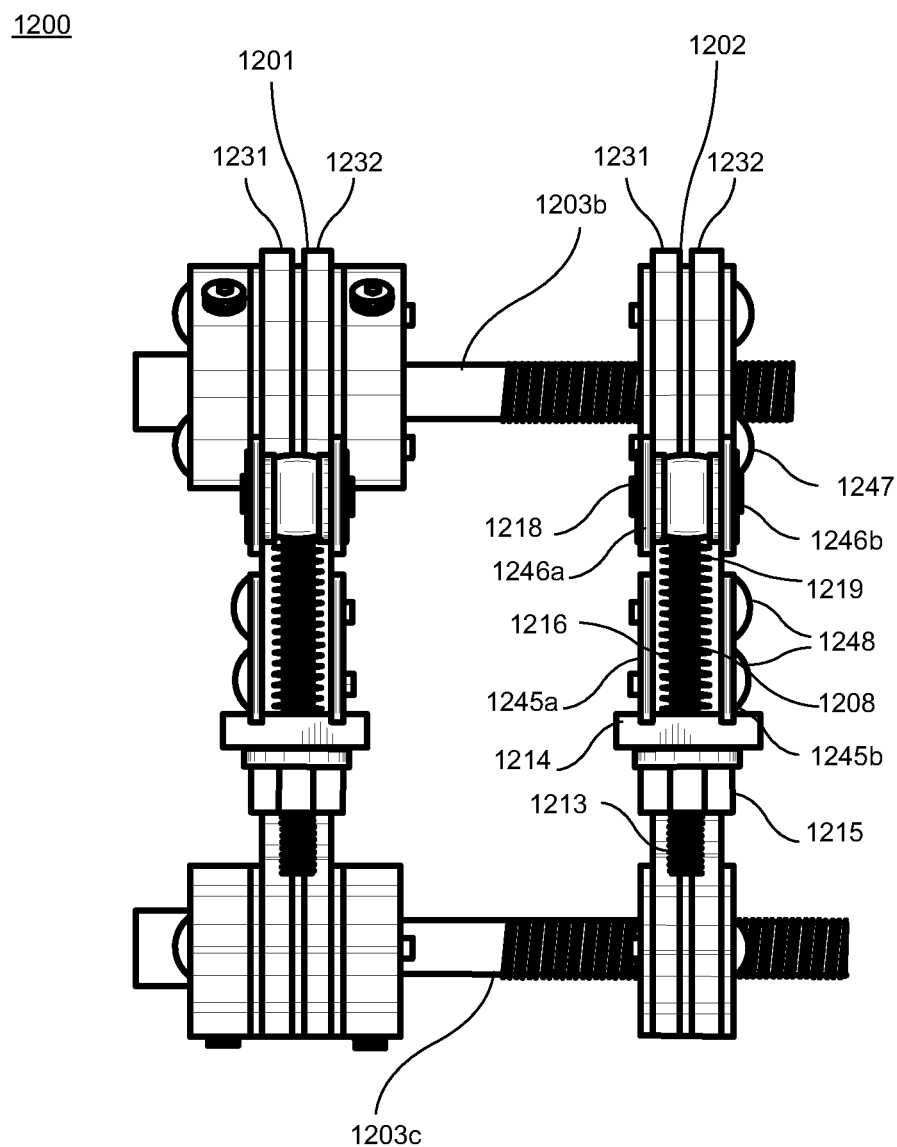
FIG. 13 shows a right side view of the alignment tool of FIG. 12.

FIGS. 12-16B illustrate another embodiment of the alignment tool. Tool 1200 is substantially similar to tool 100, but contains a smaller profile and is more lightweight. Referring to FIGS. 12-14B, there is shown an alignment tool 1200 for positioning and aligning the ends of first and second pipe sections 1211 and 1212. FIG. 12 shows a perspective view of the alignment tool 1200 attached to first and second pipe sections 1211 and 1212; FIG. 13 shows a right side view of the alignment tool 1200; FIG. 14A shows a front view of the alignment tool 1200 in a closed position; and FIG. 14B shows a front view of the alignment tool 1200 in an opened position. Tool 1200 includes a pair of clamping rings 1201 and 1202, interconnected by a plurality of swivel assemblies 1203a, 1203b, and 1203c. Swivel assemblies 1203a, 1203b, and 1203c are circumferentially spaced about clamping rings 1201 and 1202. In a preferred embodiment, the various components of the alignment tool 1200, including swivel assemblies 1203a, 1203b, and 1203c, are disposed within the tool such that they are located substantially within the outer circumference of clamping rings 1201 and 1202, such as shown in FIG. 12. As a result, the alignment tool 1200 is compact and lightweight. In order to decrease the tool's weight, each clamping ring 1201 and 1202 comprises a pair of substantially annular shaped bodies 1231 and 1232 (FIGS. 12 and 13), each subdivided into at least two semiannular segments 1204 and 1205. First and second segments 1204 and 1205 radially extend from first ends 1204a, 1205a to second ends 1204b, 1205b (FIG. 14A), and comprise front surfaces 1204c, 1205c, rear surfaces 1204d, 1205d, inner surfaces 1204e, 1205e, and outer surfaces 1204f, 1205f, respectively (FIG. 12). First ends 1204a and 1205a of first and second segments 1204 and 1205 are preferably spaced apart and interconnected using a double hinge joint 1206 (FIG. 14A), substantially similar to hinge joint 106. Hinge joints 1206 allow the semiannular segments 1204 and 1205 to be adjusted from a closed position (FIG. 14A) to an opened position (FIG. 14B), and vice versa.

Figure 14A:
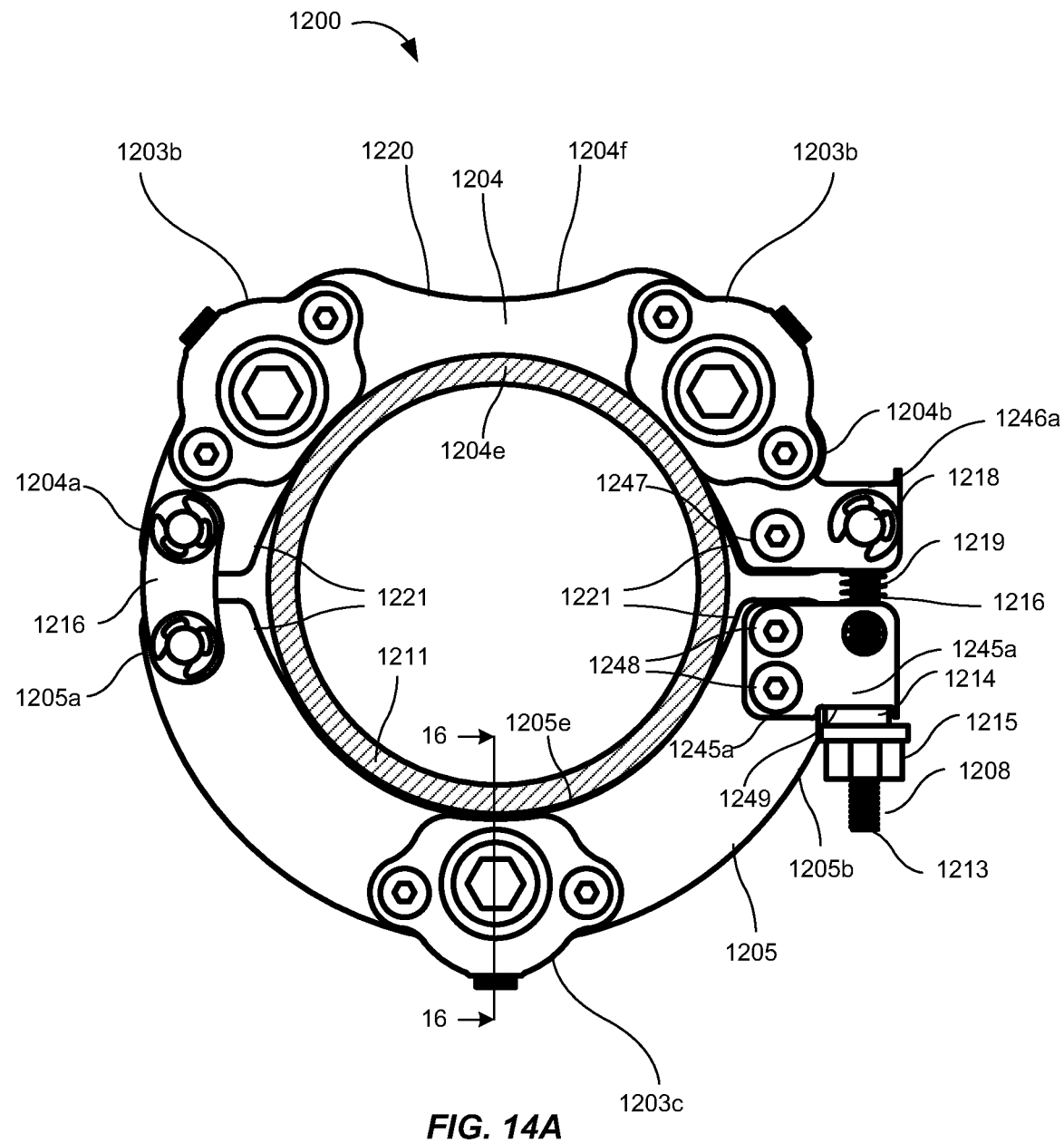
FIG. 14A shows a front view of the alignment tool of FIG. 12 in a closed position.
Figure 14B:
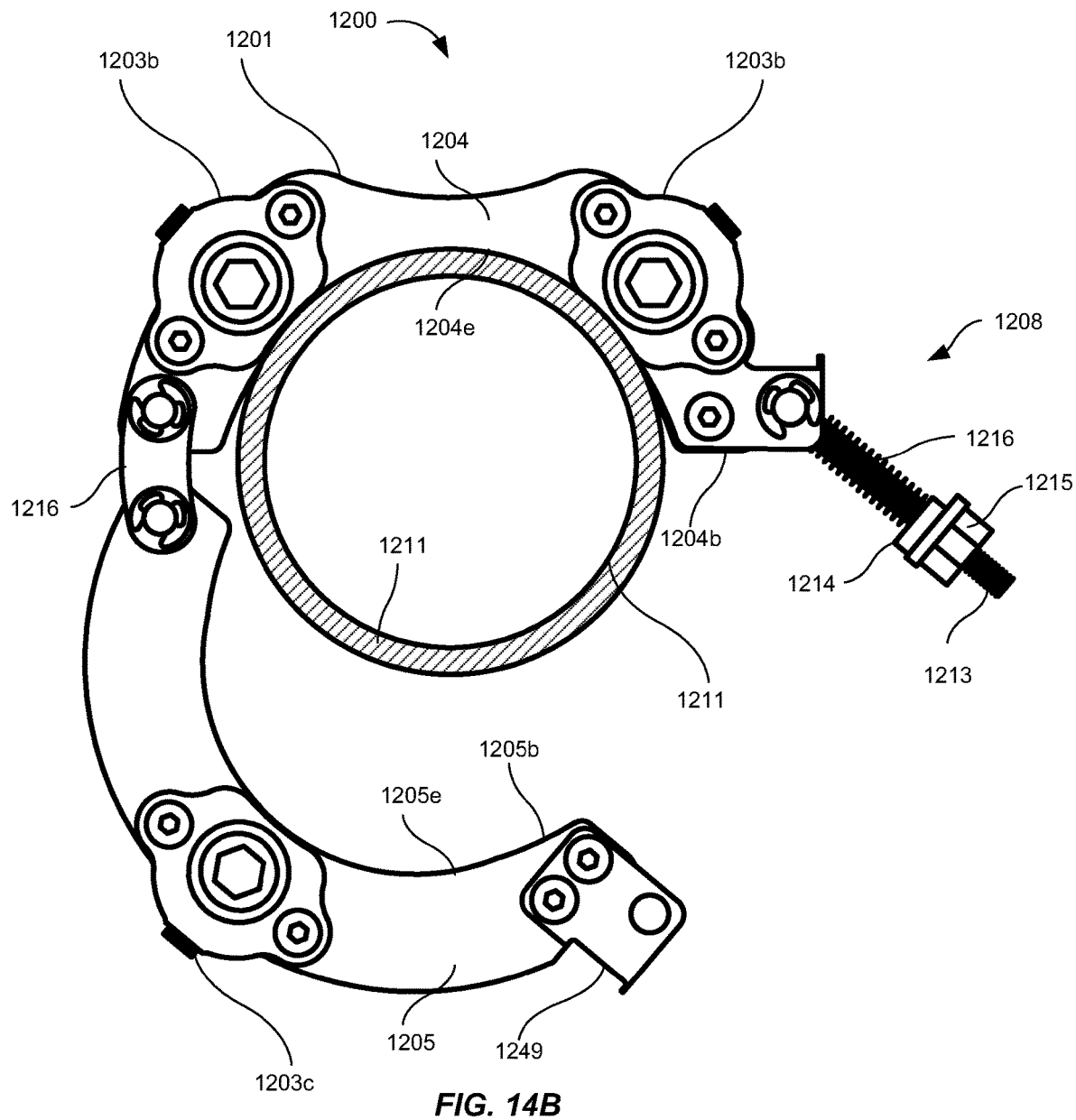
FIG. 14B shows a front view of the alignment tool of FIG. 12 in an opened position.

As shown in FIGS. 13-14B, second ends 1204b and 1205b of first and second segments 1204 and 1205 are also preferably spaced apart and interconnected using an adjustable latch toggle clamp 1208. Toggle clamp 1208 comprises a locking lever 1219 which is rotationally secured to the first end 1204b of semiannular segment 1204 via retaining plates 1246a and 1246b and pin 1218 that traverses the retaining plates 1246a and 1246b. Retaining plates 1246a and 1246b are secured to the first end 1204b of semiannular segment 1204 via rivet 1247. Locking lever 1219 comprises a threaded rod 1213 fitted with a spring 1216 as well as a hexagonal nut 1215 and an adjustable plate 1214 that travels along the rod 1213. Second end 1205b of second semiannular segment 1205 comprises retaining plates 1245a and 1245b that are secured to the second end 1255b of semiannular segment 1205 using rivets 1248. Each retaining plate 1545a, 1245b comprises a groove 1249 that receives the adjustable plate 1214 therein. Spring 1216 is used to bias the adjustable plate 1214 against the groove 1249.

Each clamping ring 1201 and 1202 comprises a scalloped cutout 1220 on the outer surface 1204f of the first semiannular segment 1204. Other shaped cutouts may also be utilized without departing from the scope of the present invention, such as, straight cutouts, semi-rectangular cutouts, semi-trapezoidal cutouts, or the like. When the alignment tool 1200 is used to be secured to an ell-fitting, for example, scalloped cutouts 1220 help accessing the joint on the inside radius of the ell-fitting during welding easier, as previously described. Additional cutouts 1221 (FIG. 14A) are provided on the inner surfaces 1204e, 1205e, on each of the first ends 1204a, 1205a and second ends 1204b, 1205b of first and second segments 1204 and 1205. Cutouts 1221 extend outwardly from the inner circumference of each clamping rings 1201, 1202 to the terminal ends of the first and second segments 1204 and 1205. Cutouts 1221 allow the clamping rings 1201, 1202 to clamp on tee fittings, cross fittings, as well as long and short radius ell fittings, as previously described.

Figure 15:
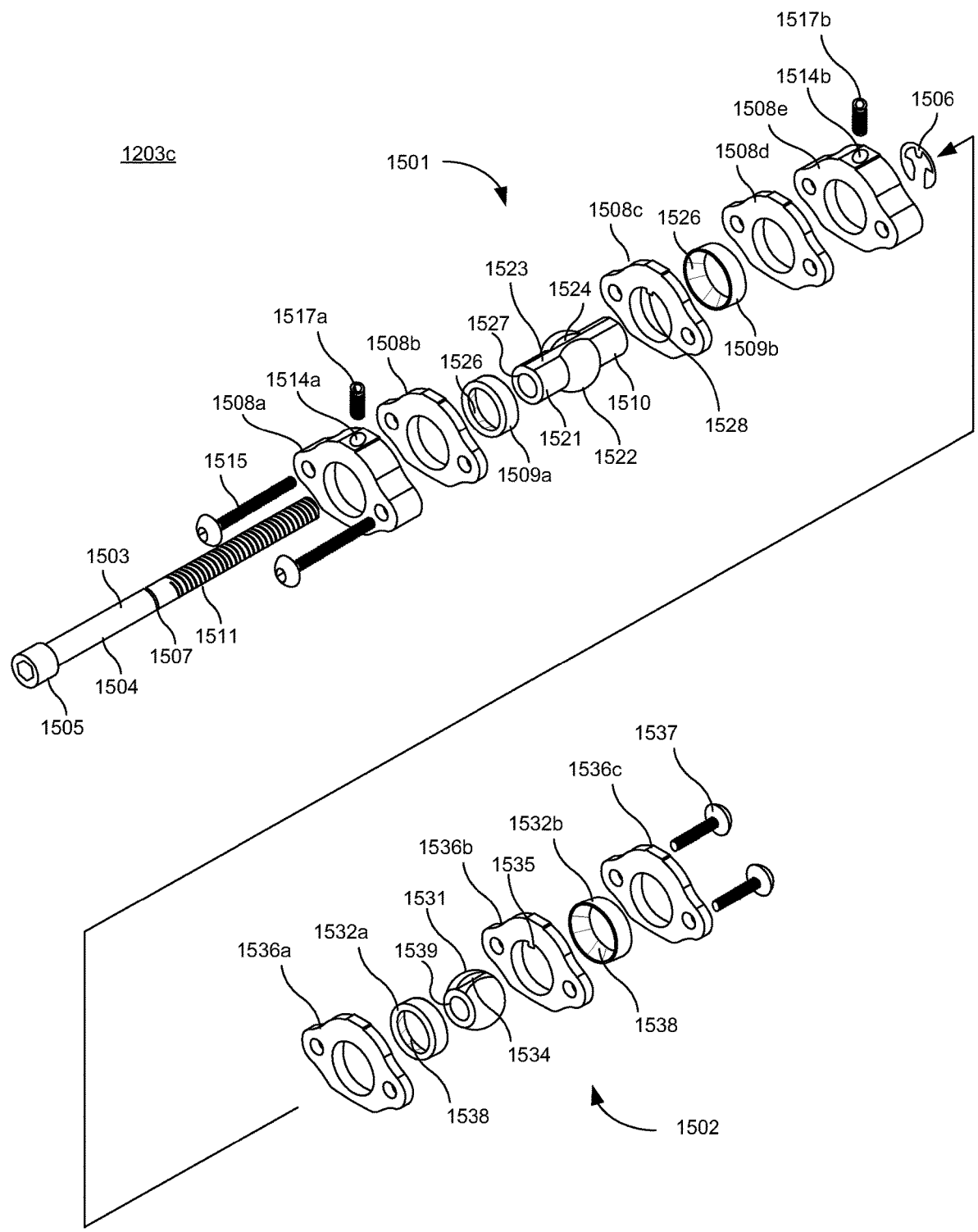
FIG. 15 shows an exploded view of a swivel assembly of the alignment tool of FIG. 12 according to another embodiment of the invention.
Figure 16A:
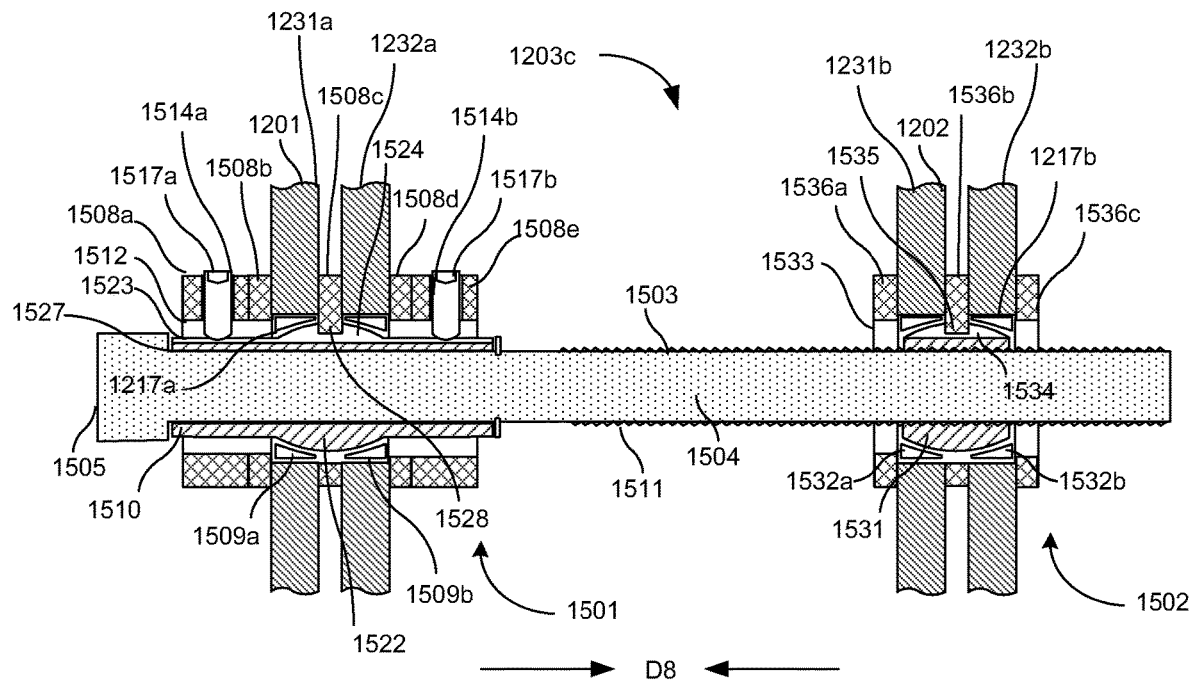
FIG. 16A shows a cross sectional view of the swivel assembly of FIG. 15 taken along line 16-16 in FIG. 14A.
Figure 16B:
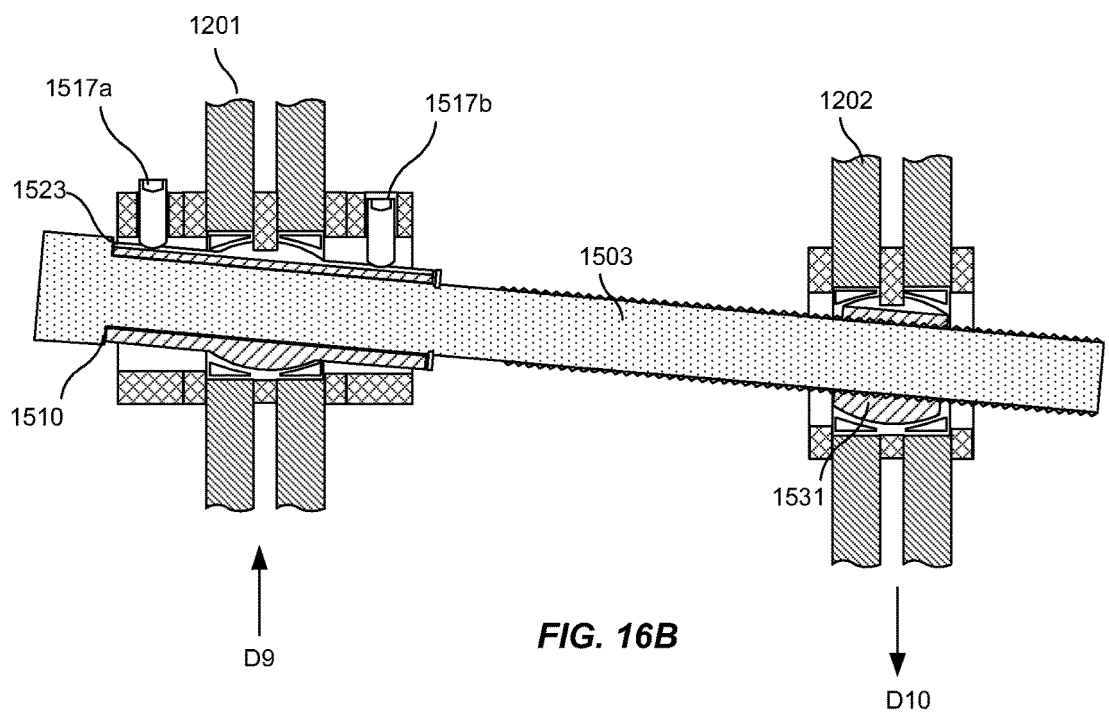
FIG. 16B shows a cross sectional view of the swivel assembly of FIG. 15 taken along line 16-16 in FIG. 14A illustrating how the alignment tool is transversely adjusted.

Referring now to FIGS. 15-16B, FIG. 15 illustrates an exploded view of the swivel assembly 1203c; FIGS. 16A-16B illustrates a cross sectional view of the swivel assembly 1203c taken along line 16-16 in FIG. 14A. Swivel assembly 1203c is substantially identical to swivel assemblies 1203a and 1203b. As shown in FIG. 16A, swivel assembly 1203c comprises a first swivel portion 1501 connected to the first clamping ring 1201 and a second swivel portion 1202 connected to the second clamping ring 1202. First and second clamping rings 1201, 1202 comprise bores 1217a, 1217b transversely extending therethrough for receiving the swivel assembly 1203c. The first and second swivel portions 1501 and 1502 are interconnected via bolt 1503. In a preferred embodiment, as shown in FIG. 13, at least one swivel assembly, in this case swivel assembly 1203c, comprises a longer bolt 1503 such that the alignment tool 1200 can be adjusted to fit elbow or ell-fittings, as previously described.

As shown in greater detail in FIG. 15, bolt 1503 comprises a shaft 1504 connected to a head 1505. The head 1505 may comprise a grade eight socket, or other types of shaped head or shaped recess, to enable rotation of the bolt 1503 using a complementary tool. Shaft 1504 comprises a groove 1507 extending circumferentially thereon. Groove 1507 is sized to receive a retaining ring or E-clip 1506. Shaft 604 further comprises threads 1511 extending circumferentially about the shaft 1504 below groove 1507.

The first swivel portion 1501 comprises substantially similar, but of varying widths, retaining plates or saddle shaped portions 1508a, 1508b, 1508c, 1508d, and 1508e, a pair of swivel races 1509a and 1509b, and an axel alignment swivel 1510. The axel alignment swivel 1510 comprises a longitudinal shaft 1521 with a partial spherical portion 1522 at its center. The shaft 1521 is longitudinally cannulated comprising longitudinal bore 1527 for receiving the bolt 1503 therethrough. The partial spherical portion 1522 comprises a longitudinal groove 1524 and the shaft 1521 comprises longitudinal groove 1523 extending on each side of the partial spherical portion 1522. Each of the pair of swivel races 1509a and 1509b comprise semicircular inner surface 1526 that corresponds to the circumference of the partial spherical portion 1522.

As shown in FIG. 16A, the pair of substantially annular shaped bodies 1231a, 1232a of first clamping ring 1201 are held together and separated via retaining plate 1508c located therebetween. Each retaining plate 1508a, 1508b, 1508c, 1508d, and 1508e comprises a bore 1512 extending therethrough for receiving the axel alignment swivel 1510. The axel alignment swivel 1510 extends through the bores 1512 of retaining plates 1508a, 1508b, 1508c, 1508d, and 1508e and bore 1217a of first clamping ring 1201 such that the partial spherical portion 1522 is located within the bore 1217a and bore 1512 of central retaining plate 1508c. The pair of swivel races 1509a and 1509b are located on either side of the partial spherical portion 1522 to retain it within the bore 1217a of first clamping ring 1201. In a preferred embodiment, bores 1512 of retaining plates 1508b and 1508d comprise smaller diameter than bore 1217a of clamping ring 1201 such that retaining plates 1508b and 1508d secure swivel races 1509a and 1509b therebetween within the bore 1217a. Retaining plate 1508c comprises a projection 1528 (shown in FIG. 15) protruding from its inner surface between swivel races 1509a and 1509b and which is received within longitudinal groove 1524 of partial spherical portion 1522. Projection 1528 is used to hold the axel alignment swivel 1510 in place so that it does not turn axially with respect to the first clamping ring 1201 as the bolt 1503 is turned to adjust the gap between the first and second clamping rings 1201 and 1202. In addition, projection 1528 ensures that the transverse screws 1517a and 1517b are maintained centered in relation to the longitudinal groove 1523 of the axel alignment swivel 1510.

As shown in FIGS. 15-16A, retaining plates 1508a, 1508b and 1508d, 1508e are secured to the opposing surfaces of the first clamping ring 1201 using rivets 1515. In addition, retaining plates 1508a, 1508e comprise transverse threaded bores 1514a, 1514b for threadably receiving threaded transverse screws 1517a, 1517b, respectively. Threaded screws 1517a, 1517b engage the longitudinal groove 1523 of the axel alignment swivel 1510 to radially adjust the axel alignment swivel 1510 with respect to the first clamping ring 1201. Bolt 1503 extends longitudinally through bore 1527 of axel alignment swivel 1510. The first swivel portion 1501 is retained between the bolt head 1505 and the retaining ring or E-clip 1506 secured to groove 1507 of bolt 1503.

Referring back to FIG. 15, the second swivel portion 1502 comprises a second partial spherical portion 1531, a pair of swivel races 1532a and 1532b, and retaining plates or saddle shaped portions 1536a, 1536b, and 1536c. The second partial spherical portion 1531 also comprises a longitudinal groove 1534 and an inner threaded bore 1539 for retaining the threads 1511 of bolt 1503. Each of the pair of swivel races 1532a and 1532b comprise semicircular inner surface 1538 that corresponds to the circumference of the partial spherical portion 1531.

Referring to FIG. 16A, the pair of substantially annular shaped bodies 1231b and 1232b of second clamping ring 1202 are held together and separated via retaining plate 1536b. Each retaining plate 1536a, 1536b, and 1536c comprises a bore 1533 extending therethrough for receiving the shaft 1504 of bolt 1503. The second partial spherical portion 1531 is located within bore 1217b of the second clamping ring 1202 and bore 1533 of retaining plate 1536b.

The pair of swivel races 1532a and 1532b are located on either side of the second partial spherical portion 1531 to retain it within the bore 1217b of second clamping ring 1202. In a preferred embodiment, bores 1533 of retaining plates 1536a and 1536c comprise smaller diameter than bore 1217b of second clamping ring 1202 such that retaining plates 1536a and 1536c secure swivel races 1532a and 1532b therebetween within the bore 1217b. Retaining plate 1536b comprises a projection 1535 (shown in FIG. 15) protruding from its inner surface between swivel races 1532a and 1532b and which is received within longitudinal groove 1534 of second partial spherical portion 1531. Projection 1535 holds the second partial spherical portion 1531 in place so that it does not turn axially with respect to the second clamping ring 1202 as the bolt 1503 is turned to adjust the gap between the first and second clamping rings 1201 and 1202. Retaining plates 1536a and 1536c are secured to the opposing surfaces of the second clamping ring 1202 using rivets 1537. Bolt 1503 extends longitudinally through bore 1539 of second partial spherical portion 1531 such that threads 1511 of bolt 1503 engage the inner threads of bore 1539 of second partial spherical portion 1531.

In an alternative embodiment, the first swivel portion 1501 and the second swivel portion 1502 are substantially identical, both comprising either the adjustable axel alignment swivel 1510 or the second partial spherical portion 1531 as described above.

The following section describes how the alignment tool 1200 is attached to the first and second straight pipe sections 1211 and 1212 to align these sections as shown in FIG. 12. Referring to FIG. 14B, as the alignment tool 1200 is in an unclamped position clamping ring 1201 fits over pipe section 1211 by positioning the two semiannular segments 1204 and 1205 around the pipe section 1211. The two semiannular segments 1204 and 1205 are brought together around the pipe section 1211 such that the inner surfaces 1204e, 1205e of the two semiannular segments 1204 and 1205 contact the outer surface of pipe section 1211 (FIG. 14A). Next, the toggle clamp 1208 is used to tightly secure the clamping ring 1201 around pipe section 1211. Specifically, the adjustable plate 1214 of toggle clamp 1208 is placed underneath the groove 1249 at the second end 1205b of the second semiannular segment 1205 by rotating the locking lever 1219. If necessary, hexagonal nut 1215 is loosened to longitudinally lower the adjustable plate 1214 along threaded rod 1213 such that it can engage groove 1249. Once the adjustable plate 1214 is placed underneath the groove 1249, nut 1215 may be tightened, biasing spring 1216. This brings second ends 1204b, 1205b of first and second segments 1204 and 1205 closer together, thereby tightening the clamping ring 1201 around pipe section 1211. Clamping ring 1202 fits over pipe section 1212 in substantially the same manner as described above with reference to clamping ring 1201.

After clamping rings 1201 and 1202 are connected to pipe sections 1211 and 1212, the clamping rings 1201 and 1202 are adjusted to bring the ends of pipe section 1211 and 1212 in contact and in perfect alignment. As shown in FIG. 16A, to bring the ends of the pipes 1211 and 1212 to be joined towards each other, head 1505 of bolt 1503 of each swivel assembly 1203a, 1203b, 1203c is tightened forcing threads 1511 to further engage the inner threads of the spherical portion 1531. As a result, clamping rings 1201 and 1202 are pulled in direction D8 towards each other. Similarly, to bring the ends of the pipes 1211 and 1212 away from each other, head 1505 of bolt 1503 of each swivel assembly 1203a, 1203b, and 1203c is loosened forcing threads 1511 to unthread from the inner threads of the spherical portion 1531.

Referring to FIGS. 16A-16B, to adjust the clamping rings 1201 and 1202 transversely in relation to each other, the transverse screws 1517a, 1517b of each swivel assembly 1203a, 1203b, and 1203c, are either tightened or loosened as required. Specifically referring to FIG. 16B, tightening transverse screw 1517b and loosening transverse screw 1517a will force the axel alignment swivel 1510 to swivel in clockwise direction as transverse screws 1517a, 1517b engage the longitudinal groove 1523 of the axel alignment swivel 1510. This causes the second partial spherical portion 1531 to also swivel in a clockwise direction. Accordingly, first clamping ring 1201 will be forced upward in direction D9 and second clamping ring 1202 will be forced downward in direction D10. To adjust clamping rings 1201 and 1202 transversely in a reverse direction or counterclockwise, transverse screw 1517*a* is tightened and transverse screw 1517*b* is loosened as transverse screws 1517*a*, 1517*b* engage the longitudinal groove 1523 of the axel alignment swivel 1510. This causes the second partial spherical portion 1531 to also swivel in a counterclockwise direction. As a result, first clamping ring 1201 will be forced downward and second clamping ring 1202 will be forced upward. This allows the alignment tool 1200 to transversely adjust the ends of pipe sections 1211 and 1212 so that they are perfectly longitudinally aligned and coextensive.

Alignment tool 1200 may engage various types of pipe segments, including straight pipe segments, elbow or ell-fittings, tee pipe fittings, branch portions of the tee pipe fittings in substantially the same manner as described above with reference to alignment tool 100 in FIGS. 9A 11B.

As will be apparent to those skilled in the art, numerous variations may be practiced within the spirit and scope of the present invention. For example, while manually rotatable bolts are illustrated to longitudinally adjust the swivel assemblies, various well-known devices may be utilized in association with the swivel assemblies for ease of adjustment, such as hydraulic rams, robotic arms, linear actuators, or the like. In addition, various components such as the bolts, nuts and the like may be provided with structures to capture and retain these components thereby eliminating loose parts which could possibly fall into one of the pipes or in other areas in which the pipe modules are installed on board ship or in any other installation. Quick fastener arrangements, ratchet devices and the like, may be utilized in lieu of bolts depending upon the installation requirements. There may also be variation in the procedure used to attach the alignment tool to the pipes and pipe fittings depending on the size and types of pipes or pipe fittings used. Certain steps may be omitted or combined with other steps and certain steps can be performed in a different order.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

What is claimed is:

1. An alignment tool for positioning and aligning pipe ends comprising:
   a first clamping ring comprising a first segment and a second segment;
   a second clamping ring comprising a first segment and a second segment;
   a first swivel assembly connecting the first segment of the first clamping ring and the first segment of the second clamping ring;
   a second swivel assembly connecting the second segment of the first clamping ring and the second segment of the second clamping ring;
   wherein the first clamping ring and the second clamping ring each have an outer edge, and the first swivel assembly and second swivel assembly are disposed substantially within the outer edge of each of the first and second clamping rings;
   wherein the first and second swivel assemblies adjust the distance between the first and second clamping rings and adjust the first and second clamping rings transversely and axially with respect to each other.

2. The alignment tool of claim 1, wherein each of the first segment and second segment of the first clamping ring and each of the first segment and second segment of the second clamping ring extends from a first end to a second end.

3. The alignment tool of claim 2, wherein the first ends of the first and second segments of the first clamping ring are interconnected using double hinge joints.

4. The alignment tool of claim 2, wherein the second ends of first and second segments of the first clamping ring are interconnected using adjustable latch toggle clamps.

5. The alignment tool of claim 4, wherein the adjustable latch toggle clamp comprises a locking lever rotationally secured to the second end of the second segment and a U-shaped rod rotationally secured to the locking lever, wherein the second end of the first segment comprises a groove transversely extending on its outer surface that is used to catch the U-shaped rod therein.

6. The alignment tool of claim 5, wherein each U-shaped rod comprises threaded ends such that the rod can be longitudinally adjusted with respect to the locking lever using hexagonal nuts.

7. The alignment tool of claim 4, wherein the adjustable latch toggle clamp comprises a locking lever rotationally secured to the second ends of the first segments, wherein the locking lever comprises a threaded rod and an adjustable plate that travels along the rod, and wherein the second end of the second segment comprises a groove oriented and sized to receive said adjustable plate.

8. The alignment tool of claim 4, wherein the first clamping ring comprises a recess in its outer surface sized to accommodate the adjustable latch toggle clamp such that in a closed position the toggle clamp is substantially coextensive with the outer circumference of the first clamping ring.

9. The alignment tool of claim 1, wherein each of the first and second clamping rings comprises a scalloped cutout on its outer surface such that a joint on an inside radius of two transverse tubular sections can be accessed during welding.

10. The alignment tool of claim 2 further comprising a first pair of inner cutouts each extending outwardly from an inner circumference of each of the first and second clamping rings to the first ends of each of the first and second segments.

11. The alignment tool of claim 10, further comprising a second pair of inner cutouts each extending outwardly from an inner circumference of each of the first and second clamping rings to the second ends of each of the first and second segments.

12. The alignment tool of claim 1, wherein each swivel assembly comprises a first swivel portion connected to the first clamping ring and a second swivel portion connected to the second clamping ring, wherein the first and second clamping rings comprise bores extending therethrough that receive the plurality swivel assemblies.

13. The alignment tool of claim 12, wherein each swivel assembly comprises a threaded bolt that adjusts the distance between the first and second clamping rings, wherein each threaded bolt extends through said bores of the first and second clamping rings.

14. The alignment tool of claim 13, wherein the first swivel portion comprises an axel alignment swivel including a longitudinal shaft with a first partial spherical portion at its center, wherein the partial spherical portion is retained within a bore extending through said first clamping ring.

15. The alignment tool of claim 14, wherein the longitudinal shaft comprises a longitudinal bore that receives the threaded bolt therethrough.

16. The alignment tool of claim 14, wherein the first swivel portion comprises:
a pair of swivel races located on either side of the first partial spherical portion to retain it within the bore of the first clamping ring; and
a first pair of retaining plates that retain the pair of swivel races and the first partial spherical portion within the bore of the first clamping ring.

17. The alignment tool of claim 16, wherein the longitudinal shaft comprises longitudinal grooves on either side of the first partial spherical portion, wherein the first pair of retaining plates comprise transverse threaded bores that threadably receive threaded transverse screws, and wherein the transverse threaded screws engage the longitudinal grooves to axially adjust the axel alignment swivel with respect to the first clamping ring.

18. The alignment tool of claim 13, wherein the second swivel portion comprises a second partial spherical portion which is retained within a bore extending through said second clamping ring.

19. The alignment tool of claim 18, wherein the second swivel portion axially adjusts the first and second clamping rings with respect to each other.

20. The alignment tool of claim 18, wherein the second partial spherical portion comprises an inner threaded bore that receives the threaded bolt therethrough.

* * * * *